(12) United States Patent
Berntorp

(10) Patent No.: US 11,597,364 B2
(45) Date of Patent: Mar. 7, 2023

(54) SYSTEM AND METHOD FOR DETERMINING FRICTION CURVE OF TIRE

(71) Applicant: Mitsubishi Electric Research Laboratories, Inc., Cambridge, MA (US)

(72) Inventor: Karl Berntorp, Skanor SKA (SE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 236 days.

(21) Appl. No.: 16/298,245

(22) Filed: Mar. 11, 2019

(65) Prior Publication Data

US 2020/0290577 A1 Sep. 17, 2020

(51) Int. Cl.
*B60T 8/1761* (2006.01)
*B60T 8/172* (2006.01)
*B60W 40/068* (2012.01)

(52) U.S. Cl.
CPC .......... *B60T 8/1761* (2013.01); *B60T 8/1725* (2013.01); *B60W 40/068* (2013.01); *B60T 2210/12* (2013.01); *B60W 2520/26* (2013.01)

(58) Field of Classification Search
CPC .................................................. B60W 40/68
See application file for complete search history.

(56) References Cited

U.S. PATENT DOCUMENTS

| | | | |
|---|---|---|---|
| 9,884,585 B1* | 2/2018 | Lubbers | B60Q 9/008 |
| 2018/0136660 A1* | 5/2018 | Mudalige | G01S 13/867 |
| 2018/0286242 A1* | 10/2018 | Talamonti | B60W 30/14 |
| 2019/0047575 A1* | 2/2019 | Lellmann | G08G 1/096741 |
| 2019/0126933 A1* | 5/2019 | Jonasson | B60W 30/146 |
| 2019/0143963 A1* | 5/2019 | Schlegel | B60W 50/0097 701/70 |
| 2019/0337507 A1* | 11/2019 | Stein | G05D 1/0212 |

* cited by examiner

*Primary Examiner* — Imran K Mustafa
(74) *Attorney, Agent, or Firm* — Gennadiy Vinokur; Hironori Tsukamoto

(57) ABSTRACT

A system calibrates a function of a tire friction of a vehicle traveling on a road from motion data including a sequence of control inputs to the vehicle that moves the vehicle on the road and a corresponding sequence of measurements of the motion of the vehicle moved by the sequence of control inputs. The system updates iteratively the probability distribution of the tire friction function until a termination condition is met, wherein, for an iteration, the system samples the probability distribution of the tire friction function, determines a state trajectory of the vehicle to fit the sequence measurements according to the measurement model and the sequence of control inputs according to the motion model including the sample of the tire friction function, and updates the probability distribution of the tire friction function based on the state trajectory of the vehicle.

20 Claims, 31 Drawing Sheets

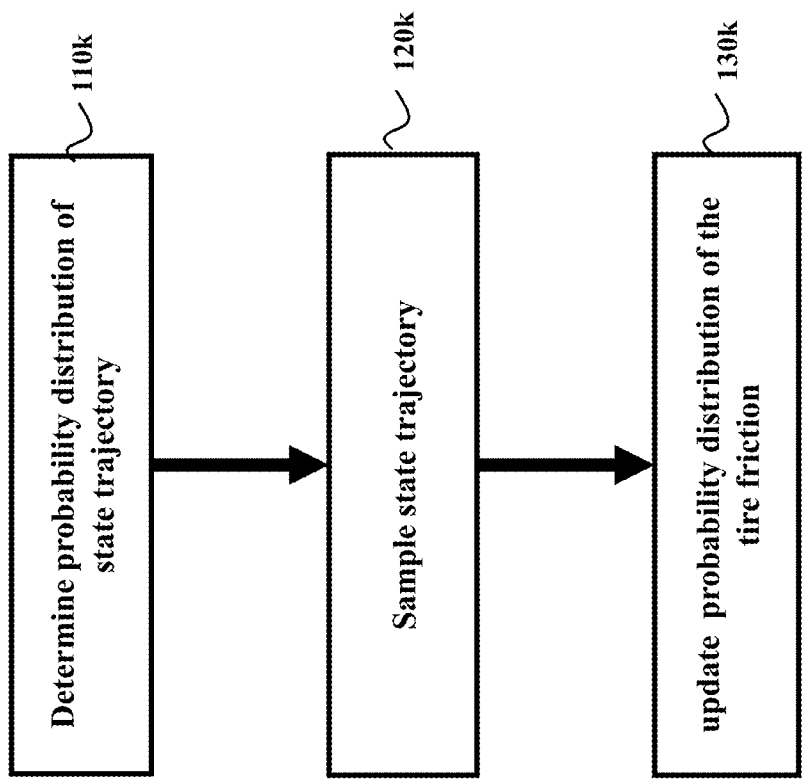

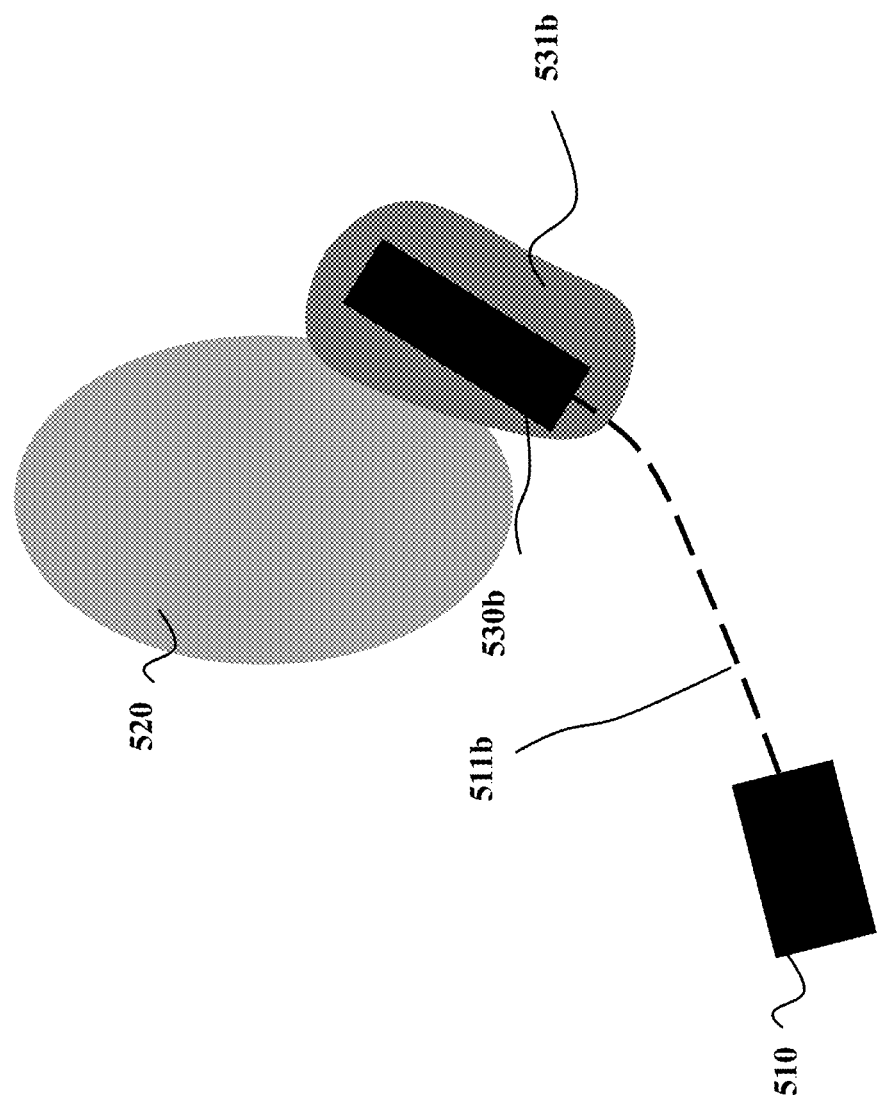

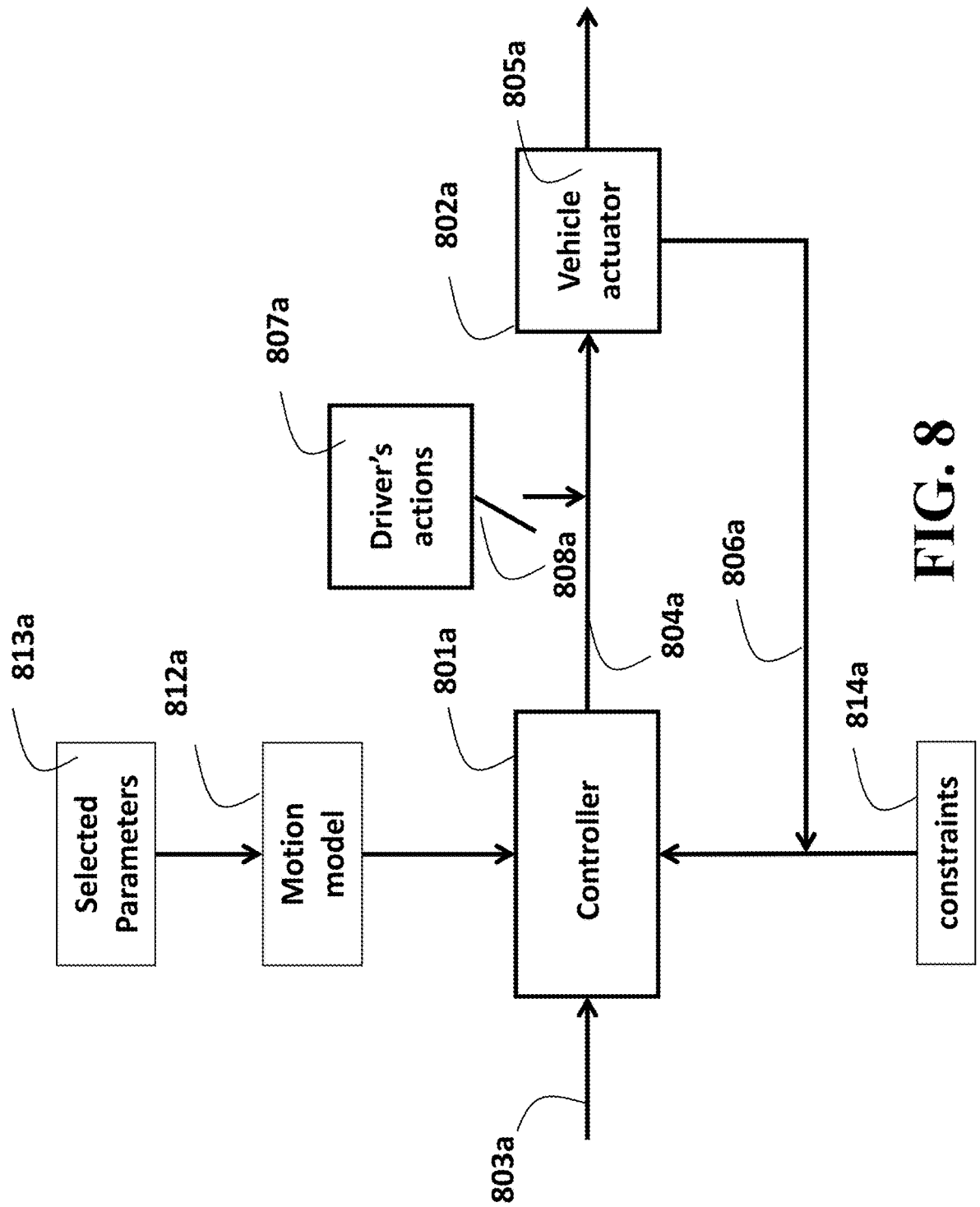

SYSTEM AND METHOD FOR DETERMINING FRICTION CURVE OF TIRE

TECHNICAL FIELD

The invention relates generally to vehicle control, and more particularly to methods and apparatus for determining friction curve of tire from data collected during vehicle control.

BACKGROUND

The tire-to-road interaction is the dominating factor in generating, or changing, the motion of a wheeled vehicle, and the knowledge of variables related to the tire-to-road interaction is essential for many active safety systems in modern vehicles. Parameters related to the road friction are employed in many modern vehicles. For example, anti-lock braking systems (ABS), electronic stability control systems (ECS), and advanced driver-assistance systems (ADAS), all make extensible use of parameters related to the tire-to-road interaction, in order to provide advanced safety mechanisms.

Even though several factors determine the tire-road interaction, it is common to model the tire friction as a static function of the wheel slip. In a longitudinal case, i.e., in the wheel's forward direction, the slip is defined in terms of the difference of the longitudinal velocity and the rotational speed of the wheel normalized by either the rotational speed of the wheel or the longitudinal velocity, whichever one is greater, i.e., whether the wheel is accelerating or braking. In a lateral case, i.e., in the wheel's lateral direction, the slip is defined in terms of a ratio between the wheel's lateral and longitudinal velocity components.

Knowledge of the tire function is important for reliable vehicle control, as several approaches for enabling ADAS features rely on an accurate model of the tire friction's variation with the slip. Unfortunately, the vehicle states involved in the tire-friction estimation are not directly measured in production vehicles. Therefore, tire-friction estimation is usually done by either indirect friction determination methods, sometimes in combination with sensors that are too expensive to be deployed in production vehicles.

A number of methods aim to estimate the parameters of the tires using various optimization techniques. For example, the method described in U.S. Pat. No. 8,065,067 uses bins of collected data to approximate a nonlinear function and minimizing error of the friction using nonlinear optimization. However, the nonlinear optimization is known to be prone to lack of convergence of convergence in a local optimum. Furthermore, relying on nonlinear optimization necessitates the use of a particular tire model, which is suboptimal because different tire models are suitable for different purposes.

Methods for determining the tire friction are often based on high-precision sensor setups or test rigs. However, high-precision sensors are costly and test rigs are only an approximation of the real world, so that determining a particular tire model in a test rig will only be true for that particular test rig.

Accordingly, there is a need for a system and a method for determining the tire between a road surface and a tire using sensors available in production vehicles.

SUMMARY

It is an object of some embodiments to provide a system for determining friction curve of a tire. This friction curve defines tire to road contact friction and is referred herein as a tire friction function. It is another object of some embodiment to provide a method that is suitable for determining the tire friction function from test drive motion data measured using low-cost sensors that are available in mass-production vehicles. It is another object of some embodiments to provide a method for determining the tire friction function that is probabilistic and nonparametric to capture uncertainties common in the real world. It is another object of some embodiments to provide a method for determining the tire friction function that does not rely on an a priori determined tire model.

Some embodiments are based on recognition that estimation of a tire friction function from data collected during real-time vehicle control is sensitive to disturbances and to specifics of the road which was driven during the time of data collection. Using a probabilistic approach the tire friction determination, it is possible to capture the uncertainties, not only in sensor data but also in specifics of a particular road on which the data were captured. Indeed, using a probabilistic approach gives the possibility to capture uncertainties in motion data, where uncertain data can arise both due to limited amount of data or due to limited excitation of the system in regions of the state space. Using nonparametric approach gives more flexibility, since the determined contact force friction relation is not tied to a specific model.

To this end, some embodiments first determine a probability distribution over possible functions of the friction between the road and the tire, and second determines a specific function from said probability distribution. Doing in such a manner ensures that the determined tire to road contact friction relation adheres to the uncertainties stemming from the available data.

Some embodiments are based on the recognition that the motion of the vehicle is dependent on the tire friction function describing the tire to road contact friction relation. Hence, it is tempting to iteratively estimate the state trajectory using a batch of collected sensor data, and update the tire friction function using the estimated state trajectory and the model of motion of the vehicle. However, due to various uncertainties, it is impractical to determine such a tire friction function deterministically, e.g., just by finding the tire friction function that would fit the measurements.

Some embodiments are based on the realization that the unknown tire friction can be regarded as a stochastic uncertainty of the model of the motion of the vehicle, to produce a model of motion with unknown friction. In addition, one embodiment recognizes that there are typically other disturbances acting on the motion of the vehicle. For instance, due to uncertainties in the actuators producing the control inputs, or other unmodeled dynamics, for instance, simplifications in the modeling of the suspension system of the tire. Another embodiment is based on the understanding that if the stochastic uncertainty caused by the unknown tire friction is the only stochastic component, all other errors, as the aforementioned, would be described by the unknown tire friction, which would cause wrong estimates of the tire friction. Hence, one embodiment introduces a stochastic disturbance acting on the motion model of the vehicle, which in combination with a stochastic disturbance describing the tire friction models the complete motion of the vehicle.

The measurement model of the vehicle can also be represented to include the function describing the tire to road contact friction relation, e.g., a longitudinal acceleration, a lateral acceleration, and a rotation rate of the vehicle can be measured. Using such measurements, the unknown tire friction can at least indirectly be represented by the motion model and the measurement model. The motion and the measurements are related through a state trajectory driven by a vehicle, which should be the same up to a certain threshold if the tire friction and the stochastic disturbance are known. The variation of the difference prevents determining the tire friction, but allows determining a probability distribution of the tire friction.

Some embodiments are based on the recognition that the probabilistic tire friction does not fit into the model of the vehicles. However, some embodiments are based on the realization that it is possible to sample a feasible space of functions of the tire friction and a feasible space of a variance of the stochastic disturbance, defined by their respective probability distribution, and use the sampled quantities in a joint estimation of the state trajectory, the tire friction, and the variance of the stochastic disturbance. Notably, the joint estimation of some embodiments updates probability distributions of the quantities, not the values of the quantities.

For example, some embodiments use a probability distribution of a tire friction function, also referred as a probability density function (PDF) of a tire friction function. Each sample on that PDF is the entire tire friction function, rather than a single value of a friction. In some implementations, the PDF of the tire friction function can be regarded as a Gaussian process, i.e., a distribution over functions with a continuous domain, e.g. space, such that sample of the Gaussian process is a continuous tire friction function. Representing PDF of a tire function as a Gaussian process increase the accuracy of tire friction function estimation. However, estimating of the tire friction function according to principles of a Gaussian process is a computationally challenging task.

Some embodiments are based on realization of a manner of simplification the estimation of the Gaussian process to determine the tire friction function. Specifically, in some embodiments, a tire friction function is regarded as a weighted combination of basis functions, and Gaussian process of the tire friction function is captured by Gaussian distributions of weights of basis function. It can be shown that if the weights for each basis function are modeled as a Gaussian distribution, it has interpretation of the tire friction function modeled as a Gaussian process. In other words, to update Gaussian process some embodiments can just update these Gaussian distributions of weights, and to sample tire friction function some embodiments can just sample N scalar weights from Gaussian distribution. In effect, regarding the tire friction function as a weighted combination of basis functions decreases the computational requirements for estimating the tire friction in probabilistic manner.

One embodiment is based on the insight that several control methods already employed in production vehicles are based on a particular tire model and where the controller is tuned according to the parameters of that tire model. Consequently, one embodiment uses the determined function describing the friction between the road and the tire allowing to fit the parameters of a specific tire model to the determined function, by minimizing a cost function describing the error between the specific tire model and the non-parametric function.

Accordingly, one embodiment discloses a system for calibrating a function of a tire friction of a vehicle traveling on a road, wherein the tire friction function is a nonlinear function describing a friction between a surface of the road and a tire of the vehicle as a function of wheel slip of a wheel of the vehicle. The system includes a memory configured to store a probability distribution of the tire friction function, a motion model relating control inputs to the vehicle with a state of the vehicle, and a measurement model relating measurements of motion of the vehicle with the state of the vehicle, wherein the motion model includes the tire friction function, and wherein one or combination of the motion model and the measurement model is subject to noise; an input interface configured to accept motion data indicative of motion of the vehicle on a road, wherein the motion data include a sequence of control inputs to the vehicle that moves the vehicle on the road and a corresponding sequence of measurements of the motion of the vehicle moved by the sequence of control inputs; a processor configured to update iteratively the probability distribution of the tire friction function until a termination condition is met, wherein, for an iteration, the processor is configured to sample the probability distribution of the tire friction function; determine a state trajectory of the vehicle to fit the sequence measurements according to the measurement model and the sequence of control inputs according to the motion model including the sample of the tire friction function; and update the probability distribution of the tire friction function based on the state trajectory of the vehicle; and an output interface to render at least one or a combination of the probability distribution of the tire friction function and the sample of the probability distribution of the tire friction function when the termination condition is met.

Another embodiment discloses a method for calibrating a function of a tire friction of a vehicle traveling on a road, wherein the tire friction function is a nonlinear function describing a friction between a surface of the road and a tire of the vehicle as a function of wheel slip of a wheel of the vehicle, wherein the method uses a processor coupled to a memory storing a probability distribution of the tire friction function, a motion model relating control inputs to the vehicle with a state of the vehicle, and a measurement model relating measurements of motion of the vehicle with the state of the vehicle, wherein the motion model includes the tire friction function, and wherein one or combination of the motion model and the measurement model is subject to noise, wherein the processor is coupled with stored instructions implementing the method, wherein the instructions, when executed by the processor carry out steps of the method, including accepting motion data indicative of motion of the vehicle on a road, wherein the motion data include a sequence of control inputs to the vehicle that moves the vehicle on the road and a corresponding sequence of measurements of the motion of the vehicle moved by the sequence of control inputs; updating iteratively the probability distribution of the tire friction function until a termination condition is met, wherein an iteration comprises: sampling the probability distribution of the tire friction function; determining a state trajectory of the vehicle to fit the sequence measurements according to the measurement model and the sequence of control inputs according to the motion model including the sample of the tire friction function; and updating the probability distribution of the tire friction function based on the state trajectory of the vehicle; and rendering at least one or a combination of the probability distribution of the tire friction function and the sample of the probability distribution of the tire friction function when the termination condition is met.

Yet another embodiment discloses a non-transitory computer readable storage medium embodied thereon a program executable by a processor for performing a method, wherein the medium is configured to store a probability distribution of the tire friction function, a motion model relating control inputs to the vehicle with a state of the vehicle, and a measurement model relating measurements of motion of the vehicle with the state of the vehicle, wherein the motion model includes the tire friction function, and wherein one or combination of the motion model and the measurement model is subject to noise. The method includes accepting motion data indicative of motion of the vehicle on a road, wherein the motion data include a sequence of control inputs to the vehicle that moves the vehicle on the road and a corresponding sequence of measurements of the motion of the vehicle moved by the sequence of control inputs; updating iteratively the probability distribution of the tire friction function until a termination condition is met, wherein an iteration includes: sampling the probability distribution of the tire friction function; determining a state trajectory of the vehicle to fit the sequence measurements according to the measurement model and the sequence of control inputs according to the motion model including the sample of the tire friction function; and updating the probability distribution of the tire friction function based on the state trajectory of the vehicle; and rendering at least one or a combination of the probability distribution of the tire friction function and the sample of the probability distribution of the tire friction function when the termination condition is met.

BRIEF DESCRIPTION OF THE DRAWINGS

FIG. 1K shows a block diagram of a method for updating the PDF of a tire friction function according to one embodiment.

FIGS. 5A and 5B show schematics illustrating principles of some embodiments.

FIG. 8 shows a block diagram for how the selected parameters interact with various vehicle controllers according to some embodiments.

DETAILED DESCRIPTION

Figure 1A:
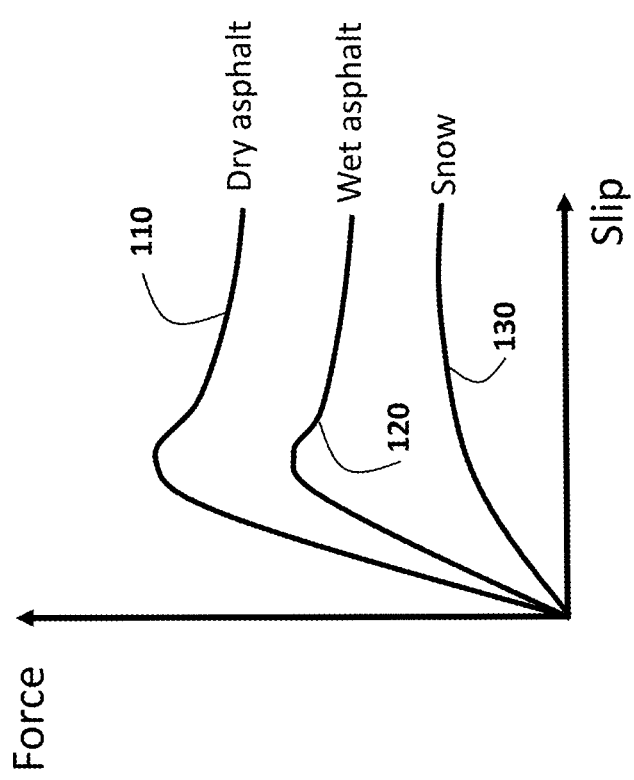
FIG. 1A shows an illustration of different tire friction functions determined by some embodiments.

FIG. 1A shows an illustration of different tire friction functions determined by some embodiments. The magnitude of the force on a tire of vehicle traveled on a road varies with the slip for different types of the surface of the road such as dry asphalt 110, wet asphalt 120, and snow 130 surfaces. The tire-force relationship is highly nonlinear and also depends on other factors, such as tire pressure, vehicle mass, tire temperature, and wear on the tire. As used herein, a vehicle can be any type of wheeled vehicle, such as a passenger car, bus, or rover.

FIG. 1A shows an exemplar situation of the tire force dependence on the slip. This is a per se method of illustrating the tire-force relationship, since slip is the dominating factor in determining the tire force. FIG. 1A can illustrate the longitudinal force, in which case the slip is defined in terms of the difference of the longitudinal velocity and the rotational speed of the wheel normalized by either the rotational speed of the wheel or the longitudinal velocity, whichever one is greater. FIG. 1A can illustrate the lateral force, in which case the slip is defined in terms of a ratio between the wheel's lateral and longitudinal velocity components.

FIG. 1A shows the situation when only one of the slip quantities are nonzero at the same time. In general, for example, when a driver of a vehicle is braking while also turning, both longitudinal and lateral slips are nonzero. Depending on the particular tire model used, the force-slip relation can vary.

Figure 1B:
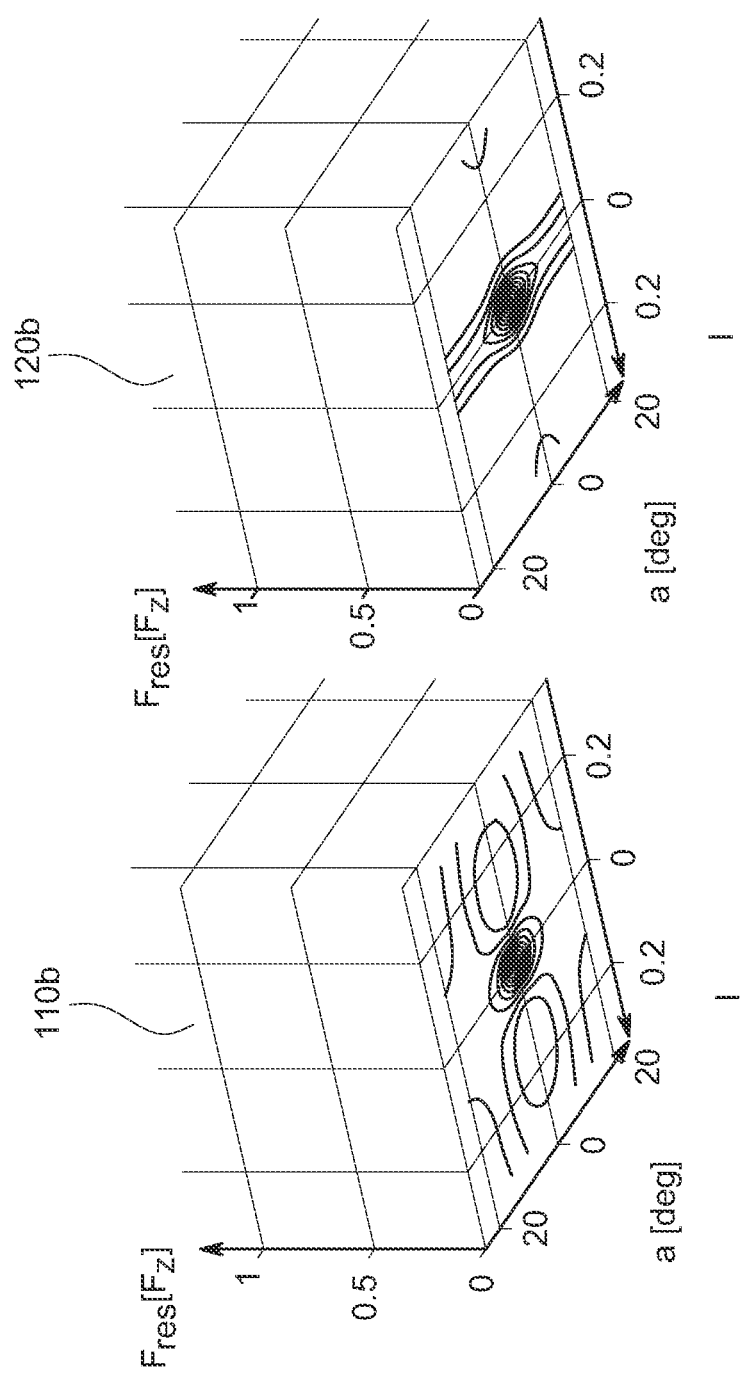
FIG. 1B shows a schematic of how the force of a tire of vehicle varies when the values of the slip vary, in both longitudinal and lateral direction used by some embodiments.

FIG. 1B shows a schematic of how the force of a tire of vehicle varies when the values of the slip vary, in both longitudinal and lateral direction used by some embodiments. The situation shows the results for two different tire friction functions 110b and 120b. In the remainder of this disclosure, one of either the longitudinal and lateral slip is zero for simplicity, but it is to be understood, and as a reader with experience within the field will appreciate, various embodiments described herein also cover the case for combined slip.

Figure 1C:
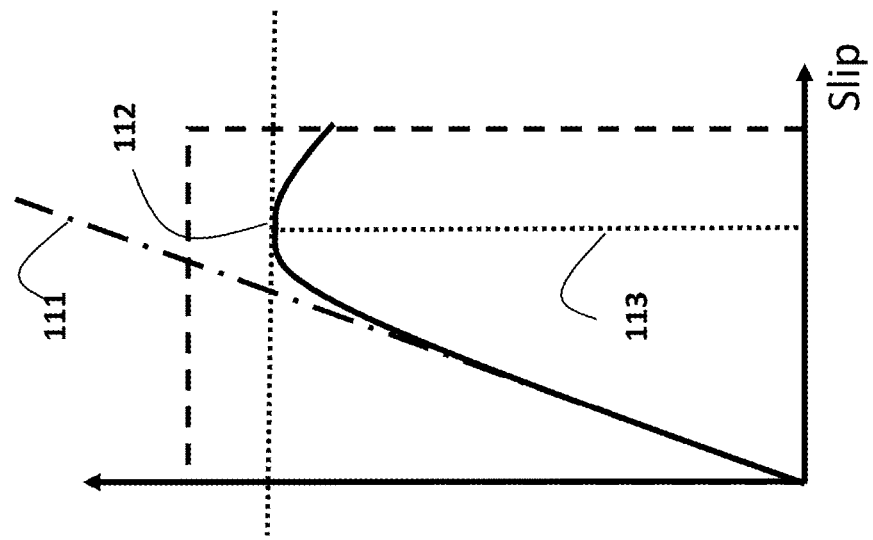
FIG. 1C shows a zoomed-in version of FIG. 1A, where the force has been normalized with the normal force resting on the wheel, where the case of dry asphalt is considered in more detail.
Figure 1C:
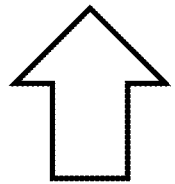
Figure 1C:
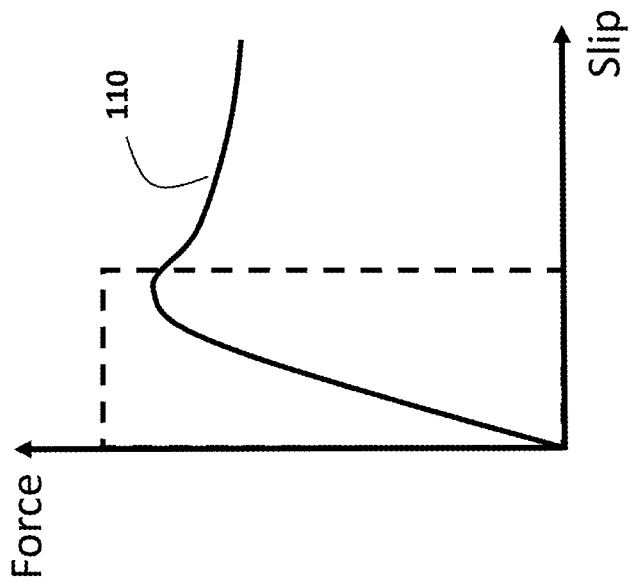

FIG. 1C shows a zoomed-in version of FIG. 1A, where the force has been normalized with the normal force resting on the wheel, where the case of dry asphalt 110 is considered in more detail. The value where the force attains its maximum is called the peak friction 112. The peak friction 112 is useful to know in several automotive control systems. For example, the knowledge of peak friction is important in order to know how much brake torque that can be applied to a particular wheel in electronic stability control systems (ESCs). The peak friction value and the corresponding slip value 113 can be used in anti-lock braking systems (ABS) to achieve optimal braking force. The initial slope 111 of the force curve 110 is usually called the stiffness of the tire. During normal driving, in which case the slip is small, the force curve can be approximated with the tire stiffness 111. As used herein, the normal driving is defined as regular driving, e.g., everyday driving in urban areas, where the vehicle avoids emergency braking and evasive steering maneuvers.

The normal driving can be contrasted with aggressive driving when extensive force is applied on the wheels of the vehicle. As used herein, the aggressive driving is defined as driving where braking/acceleration and/or steering torque is large enough such that the vehicle operates close to the tire adhesion limits of material of the tires. For example, while the validity of the linear region of the tire force function varies between different surfaces, approximating the tire force function with a linear function is valid for accelerations up to roughly 4 m/s$^2$ on asphalt surfaces, i.e., approximately 40% of the total available force on asphalt. As an example, production-type electronic stability control systems measure a deviation from a predicted measurement, using a steering wheel angle and a longitudinal velocity, to a vehicle model using the tire force function as a linear approximation. When the deviation is more than a threshold, safety braking is activated. Thus, one exemplar measure of normal driving is driving well below these activation thresholds. In other words, if the driving is not aggressive, the driving is normal.

During the aggressive driving the wheel slips more, which causes a larger force/friction variation. This variation is highly non-linear. For example, regardless of the extent of the force and type of the road, there is a maximum friction for almost all surfaces, which occurs at a point from which the force decreases when applying more braking/steering torque. After this point the increase in wheel slip results in smaller tire forces. For large wheel slip beyond the maximum force it becomes more difficult to maintain a desired wheel slip, since the dynamics becomes unstable beyond the point of maximum force. Therefore, vehicles are often controlled such that the wheel slip stays small enough such that the peak is not exceeded.

For a real-time determination of the tire friction function, which is nonlinear for large slip values, data would need to be collected on the entire tire friction function over a short time period, which is challenging because it requires driving at/close to the unstable region of the vehicle dynamics. This operating region is not typically visited during normal vehicle driving, and it may be dangerous to visit this part of the dynamics with either a controller that has not yet acquired a good prediction model for the vehicle behavior, as closed-loop instability may occur. For a human driver of the vehicle, it is possible to driving aggressive enough such that the nonlinear region is excited, however, it takes an experienced driver, since a regular driver typically is not typically used to such excessive steering and/or acceleration.

Some embodiments are based on the recognition that while it is difficult to determine in real time the tire friction function, it is possible to collect data from a test drive and determine a tire friction function a posteriori, i.e., offline, based on the test driving data covering both normal and aggressive driving.

One embodiment is based on the realization that even though production vehicles do not have the sensor equipment to measure the tire friction function directly, several of the sensors in production vehicles give indirect information about the tire friction function because they measure a vehicle state or combinations of a vehicle state. As used herein, a vehicle state includes a velocity of the vehicle and a heading rate of the vehicle. For instance, an inertial measurement unit measures a heading rate of the vehicle and an acceleration of the vehicle. Hence, an inertial sensor measures directly parts of the vehicle state. On the other hand, an acceleration sensor measures an acceleration of the vehicle, which is related to both the vehicle velocity and the tire friction function by Newton's second law. For instance, a wheel speed sensor of a vehicle gives an indication of the forward velocity of the vehicle, which can be a vehicle state.

Another embodiment recognizes the fact that although the measurements give valuable information, either about the vehicle state as for a wheel speed sensor, which in its turn provides valuable information for determining the tire friction function, or about the tire friction function as for an acceleration sensor, the measurements are subject to noise. For instance, noise due to mechanical vibrations of the placement of the sensor, or due to inherent measurement noise due to the electronics inside the sensor.

Further embodiments are based on recognition that estimation a tire friction function from data collected during real-time vehicle control is sensitive to disturbances and to specifics of the road which was driven during the time of data collection. Using a probabilistic approach the tire friction determination, it is possible to capture the uncertainties, not only in sensor data but also in specifics of a particular road on which the data was captured. Indeed, using a probabilistic approach gives the possibility to capture uncertainties in data, where uncertain data can arise both due to limited amount of data or due to limited excitation of the system in regions of the state space.

Some embodiments are based on the recognition that motion of the vehicle is dependent on the tire friction function describing the tire to road contact friction relation. Hence, it is tempting to iteratively estimate the state trajectory using a batch of collected sensor data, and update the tire friction function using the estimated state trajectory and the model of motion of the vehicle. However, because the sensor data and model of motion is uncertain, this cannot be done deterministically by taking a difference, or by finding the tire friction function that would fit the measurements.

Some embodiments are based on the realization that the unknown tire friction can be regarded as a stochastic uncertainty of the model of the motion of the vehicle, to produce a model of motion with unknown friction. In addition, one embodiment recognizes that there are typically other disturbances acting on the motion of the vehicle. For instance, due to uncertainties in the actuators producing the control inputs, or other unmodeled dynamics, for instance, simplifications in the modeling of the suspension system of the tire. Another embodiment is based on the understanding that if the stochastic uncertainty caused by the unknown tire friction is the only stochastic component, all other errors, as the aforementioned, would be described by the unknown tire friction, which may reduce accuracy of estimates of the tire friction. Hence, one embodiment introduces a stochastic disturbance acting on the motion model of the vehicle, which in combination with a stochastic disturbance describing the tire friction models the complete motion of the vehicle.

Some embodiments are based on the realization that it is possible to sample a feasible space of functions of the tire friction and a feasible space of a variance of the stochastic disturbance, defined by their respective probability distribution, and use the sampled quantities in a joint estimation of the state trajectory, the tire friction, and the variance of the stochastic disturbance. Notably, the joint estimation of some embodiments updates probability distributions of the tire friction function, not the tire friction function.

Figure 1D:
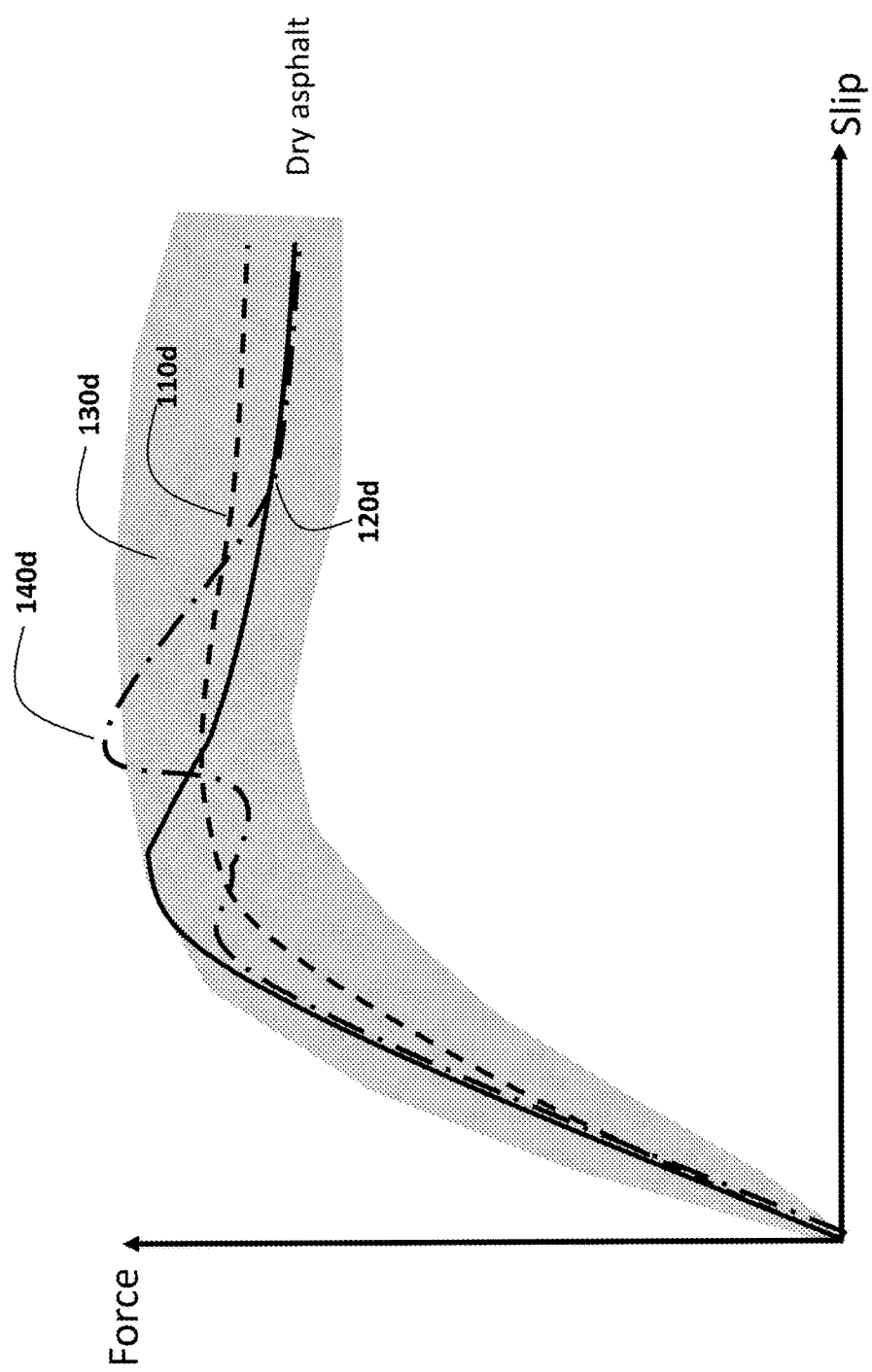
FIG. 1D shows a schematic of a sampling from a feasible space of the tire friction function determined by a probability density function (PDF) of a tire friction function according to some embodiments.

FIG. 1D shows a schematic of a sampling from a feasible space of the tire friction function determined by a probability density function (PDF) of a tire friction function according to some embodiments. Each sample on that PDF is the entire tire friction function, rather than a single value of a friction. For instance, the feasible space $130d$ is determined from the values of the PDF at each point in space, and two possible tire friction function samples $110d$ and $120d$ are feasible, since they have a finite probability of being sampled. However, sample $140d$ is unlikely to be sampled, because it is not contained in the feasible space $130d$ in its entirety.

Figure 1E:
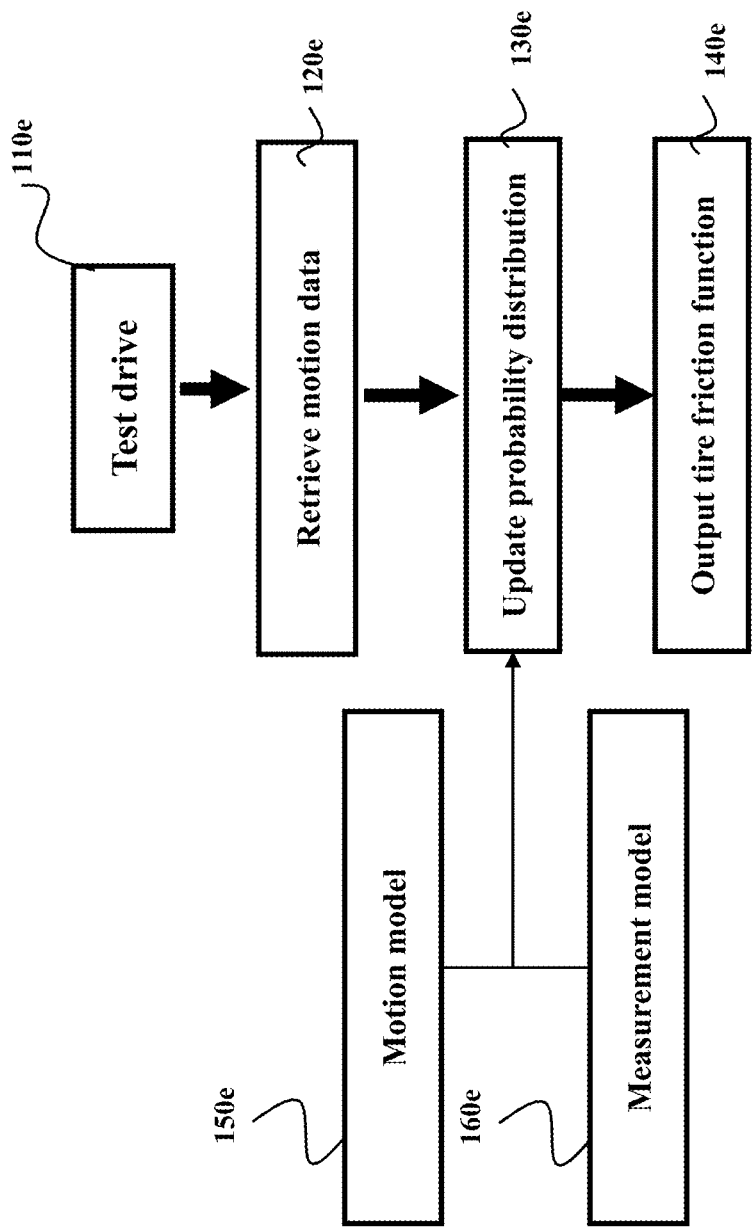
FIG. 1E shows a flowchart of a method for calibrating a function of a tire friction of a vehicle traveling on a road according to some embodiments.

FIG. 1E shows a flowchart of a method for calibrating a function of a tire friction of a vehicle traveling on a road according to some embodiments. The method updates a PDF of the tire friction function. The tire friction is a nonlinear function describing a friction between a surface of the road and a tire of the vehicle as a function of slippage of a wheel of the vehicle. The PDF of the tire friction function is a PDF determining the probability density over the possible space of tire friction functions. The method uses collected data from a test drive $110e$, wherein a test drive is performed for each surface the tire friction function is to be determined for. Then, the method retrieves motion data $120e$ and determines $130e$ the PDF of the tire friction function based on the retrieved motion data $130e$, and outputs $140e$ a tire friction function indicative of the PDF $130e$.

The PDF of the tire friction function is updated $130e$ to increase a probability of a sample of the tire friction function drawn on the updated PDF that reconciles the differences between the motion model $150e$ and measurement models $160e$ in state estimation of the vehicle. For example, the method samples the probability distribution of the tire friction function, determines a state trajectory of the vehicle to fit the sequence measurements according to the measurement model and the sequence of control inputs according to the motion model including the sample of the tire friction function, and update the probability distribution of the tire friction function based on the state trajectory of the vehicle.

Notably, the method updates the PDF of the tire friction function rather than the friction function itself. In effect, such a probabilistic update allows considering stochastic uncertainties of the tire friction determination from measurements collected from common use sensors. In addition, such a probabilistic update allows estimating the tire friction function without using a specific tire model. This, in turn, allows fitting the parameters of a specific tire model to the updated PDF of the tire friction function, which allows to adapt the tire friction estimation performed by various embodiments to different method of motion control of the vehicle.

Figure 1F:
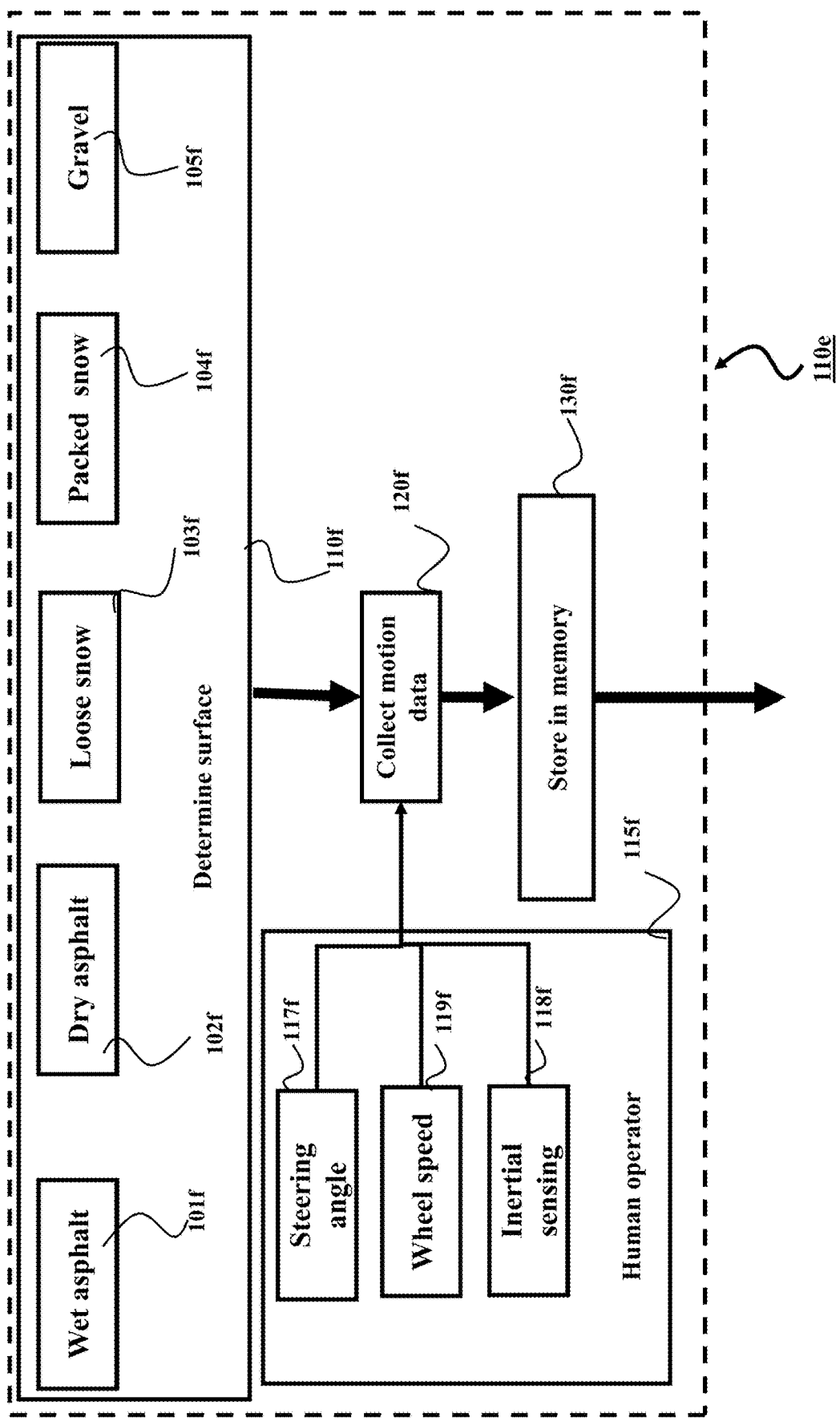
FIG. 1F shows an exemplar situation of how to collect motion data using a test drive 110e according to some embodiments.

FIG. 1F shows an exemplar situation of how to collect motion data using a test drive $110e$ according to some embodiments. A PDF of a tire friction function is determined for different surfaces. For instance, for wet asphalt $101f$ the PDF of tire friction function will be different from data collected on loose snow $103f$. Hence, in one embodiment the collecting the data is performed for several surfaces, e.g., including wet asphalt $101f$, dry asphalt $102f$, loose snow $103f$, packed snow $104f$, and gravel $105f$. After determining $110f$ a surface, a human operator $115f$ of the vehicle performs steering and braking maneuvers and data from different sensors are collected. For instance, the sensor data can include measurements of a steering angle $117f$ of the steering wheel, wheel speed measurements $119f$ of the wheels, and inertial sensing $118f$ of the motion of the vehicle. When colleting the data $120f$ is concluded, the data is written and stored $130f$ to a memory, either onboard the vehicle or a memory operatively connected to the vehicle. For instance, the data can be stored in the cloud, or the data can be stored on a local computer. In some embodiments, the PDF of tire friction function is stored remotely.

Figure 1G:
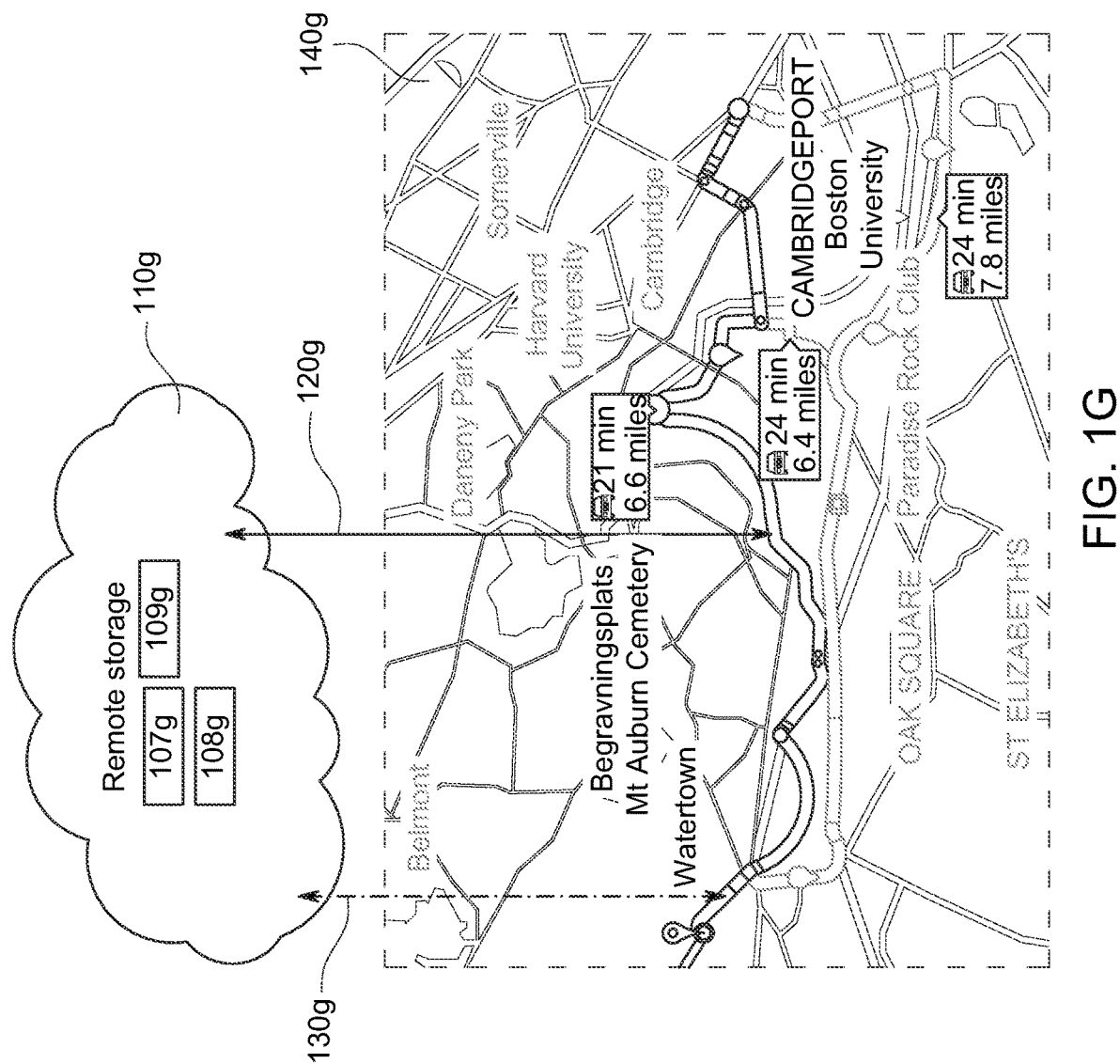
FIG. 1G shows a schematic of storing the PDF of tire friction function and data 109g indicative of the nature of the determining the PDF according to some embodiments.

FIG. 1G shows a schematic of storing the PDF $107g$ of tire friction function $108g$ and data $109g$ indicative of the nature of the determining the PDF $107g$ according to some embodiments. For instance, data $109g$ can indicate a time of which day the PDF was determined, a position of the collected data. For instance, the PDF $107g$ is indicative of a vehicle located at the arrow $120g$. This can be used by another vehicle indicated by the arrow $130g$, either to determine another route to its goal since it intersects with the position of the vehicle of PDF $107g$.

Several embodiments utilize the fact that the tire friction function and the control inputs are related to each other by the forces of the tire. In fact, the tire force is obtained from the tire friction by a scaling as a function of the vehicle mass and gravity. In one embodiment, the control inputs include commands specifying values of one or combination of a steering angle of the wheels of the vehicle and a rotational velocity of the wheels. The steering angle of the wheel affects the forces $110b$ $120b$ that can be generated in either direction of the wheel. For example, if the steering angle of the wheel is zero the vehicle is moving along a line and the forces are directed in one direction. However, if a nonzero steering angle is enforced, the force are divided into a longitudinal component and a lateral component, which affects how the tire friction function can be determined.

Some embodiments determine the PDF of the tire friction function to increase a probability of drawing a sample of the tire friction function drawn on the PDF that reconciles the differences between the motion model and measurement models in state estimation of the vehicle. The tire friction function is dependent on the vehicle state through the motion model of the vehicle that relates the vehicle state to the tire friction. The measurements may or may not include the tire friction function directly, but are indicative of the vehicle states with noise. Hence, the state determined using the motion model and the state determined using the measurement model can be compared, because the state determined using the motion model including a sample of the tire friction function is indicative of the quality of the sample of tire friction function when compared to the measurements. However, due to the presence of noise, it is more reliable to compare trajectories of the states, rather than individual states. Such a comparison reduces uncertainties of the comparison indicative of sampled tire friction function. Hence, to determine the PDF of tire friction function there is a need for determining a state trajectory of the vehicle.

Figure 1H:
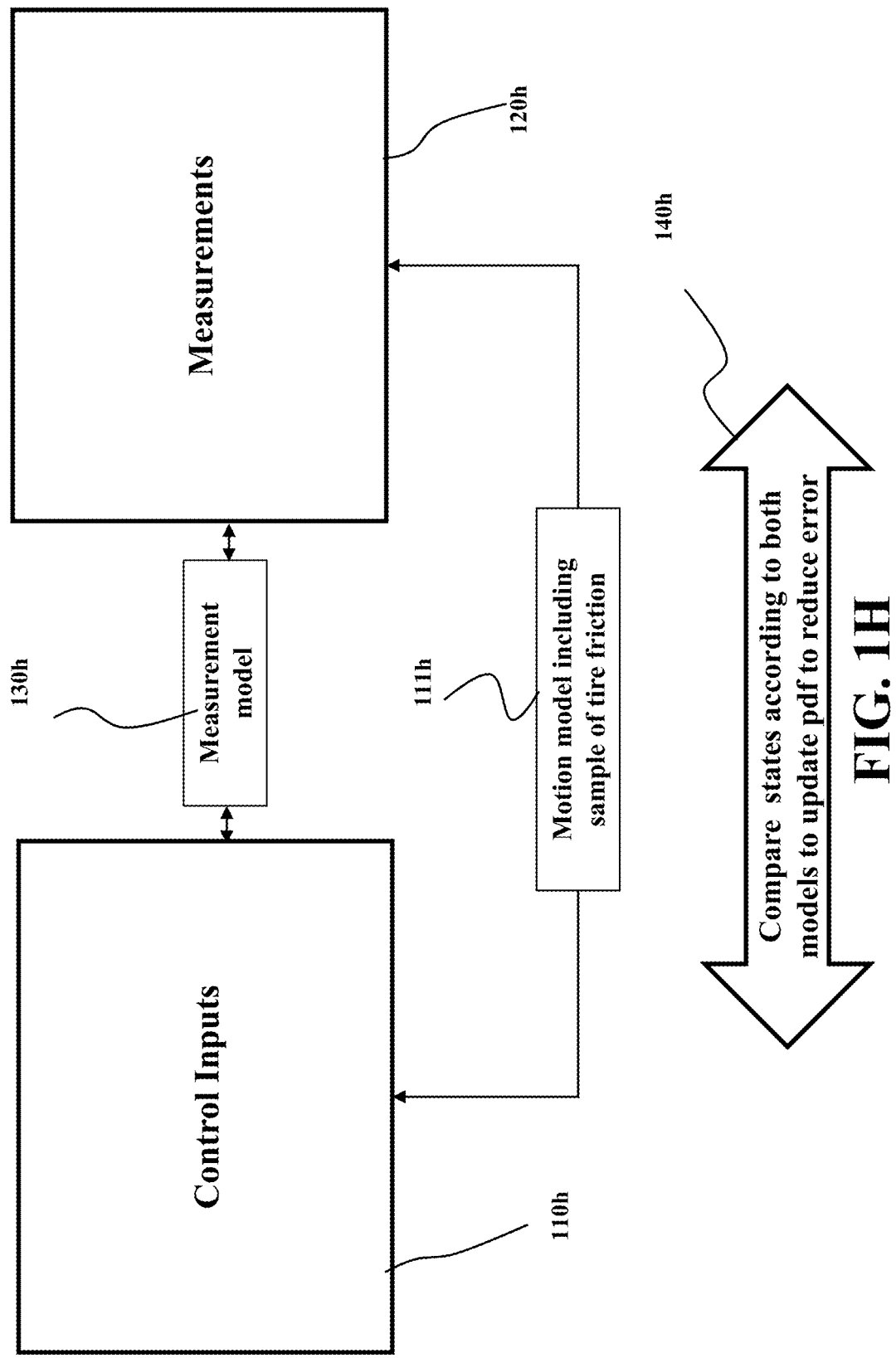
FIG. 1H shows a schematic of a method of using states of a vehicle to update the PDF of tire friction function according to some embodiments.

FIG. 1H shows a schematic of a method of using states of a vehicle to update the PDF of tire friction function according to some embodiments. The embodiments determine a state trajectory of the vehicle that fits the sequence of measurements 120h according to the measurement model 130h and the sequence of control inputs 110h according to the motion model 111h including the sample of the tire friction function. In other words, the embodiments compare 140h states of the vehicle determined according to both models to update pdf of the tire friction function to reduce error of difference in the estimations. For example, by comparing a state trajectory determined using a motion model including a sampled tire friction, with a state trajectory determined using a measurement model, it is possible to update the PDF of tire friction function to improve the sample of tire friction function to fit both the control inputs 110h and the measurements 120h. In some implementations, such a comparison is performed probabilistically to consider noise acting on one or combination of the motion model and the measurement model.

One embodiment uses measurements that include values of one or combination of a rotation rate of the vehicle and an acceleration of the vehicle, which means that the corresponding measurement model have a component dependent on the tire friction, i.e., the rotation rate, and one component independent of the tire friction, i.e., the acceleration. Thus, one embodiment utilizes the fact that information about the tire friction is contained directly in the measurement sequence. The state trajectories can be composed in several ways. In one embodiment, the state trajectory includes a sequence of states, each state includes a velocity and a heading rate of the vehicle, such that the motion models the value of the control inputs to a first value of the state of the vehicle through dynamics of the vehicle at consecutive time steps, and the measurement model relates the value of the measurement to a second value of the state of the vehicle at the same time step.

As skilled artisan would readily recognize, it is contemplated that different embodiment can add additional states into the motion model of the vehicle, such as roll angle of the vehicle and pitch angle of the vehicle. It is also possible to extend the vehicle state with states of the environments such as inclination angle of the road and bank angle of the road. Such additions complicate the estimation problem in the sense that it becomes more computationally complex, but it is well understood from the state pf the art how to add such states to model nonplanar roads. For instance, to model the inclination angle of the road it is reasonable to assume smooth changes of the inclination angle, which would add the inclination angle, the rate of the inclination angle, and the differentiation of the rate of the inclination angle.

Figure 1I:
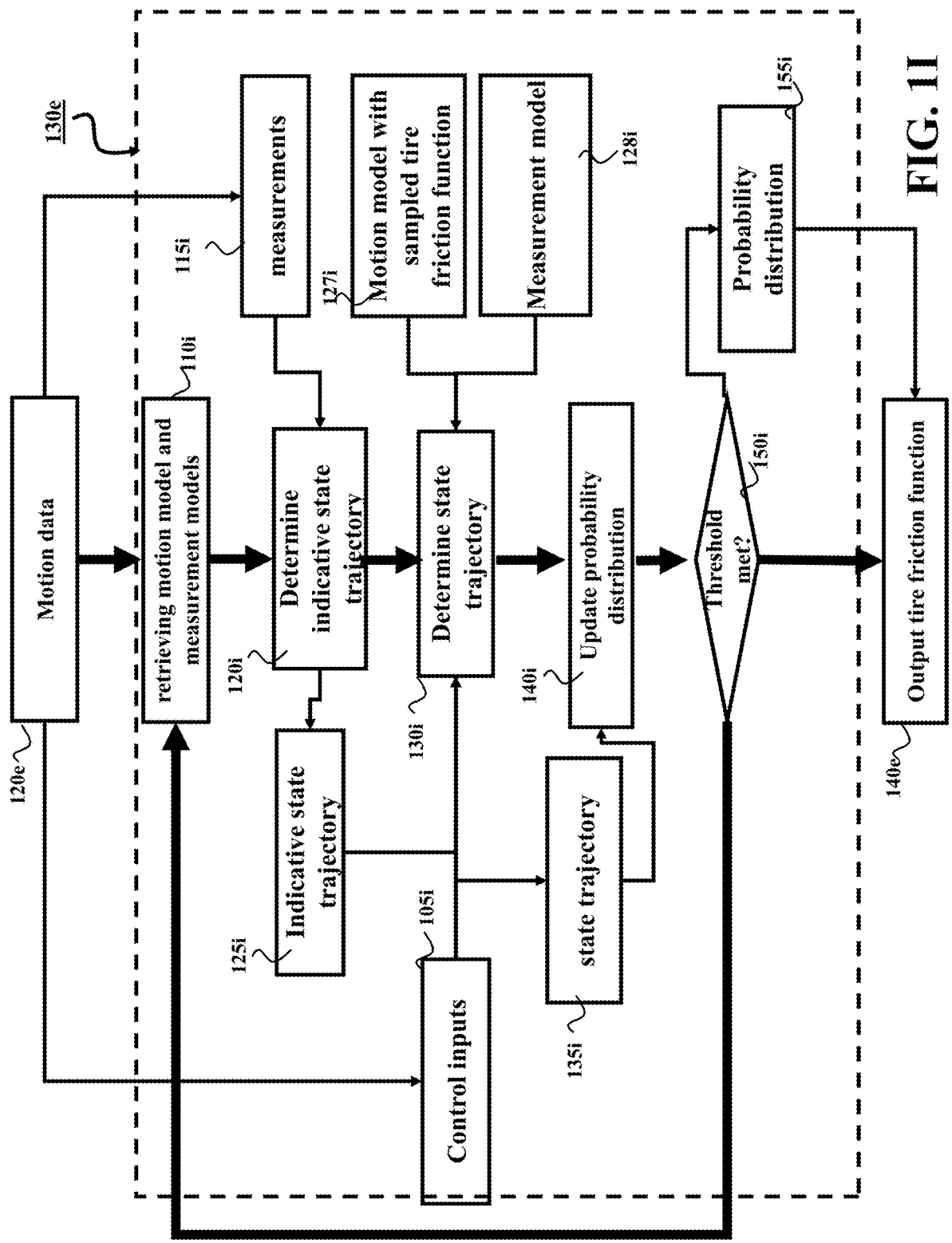
FIG. 1I shows a flowchart of a method for iteratively updating a PDF of the tire friction function until a termination condition is met according to one embodiment.

FIG. 1I shows a flowchart of a method for iteratively updating 130e a PDF of the tire friction function until a termination condition is met according to one embodiment. The embodiment is based on recognition that the unknown tire friction function can be regarded as a stochastic process acting on a model of a motion of the vehicle. The nature of the stochastic process causes the vehicle to have different possible motions for different disturbance realizations, and therefore different possible states.

The embodiment uses motion data 120e determined in advance or in real time. The embodiment retrieves 110i from a memory a model 127i of the motion of the vehicle relating control inputs 105i to the vehicle with the state of the vehicle and a model 128i of the measurements of the vehicle, relating measurements 115i of the motion of the vehicle with the state of the vehicle, wherein the control inputs 105i and measurements 115i are contained in the motion data 120e. For instance, the control inputs can be a steering angle of the steering wheel and the rotation rate of the wheels. For instance, the measurements can be a heading rate of the vehicle and an acceleration of the vehicle.

The control inputs 105i of the vehicle moves the vehicle along a trajectory. A measurement corresponding to a control input 105i is indicative of the vehicle motion at the time step corresponding to the control input, i.e., a measurement corresponding to a control input is resulted from controlling with the control input. Using the measurements 115i, the method determines 120i a state trajectory 125i indicative of the motion of the vehicle, where the measurements are related to the state using the measurement model 128i. Then, using the indicative state trajectory 125i, the sequence of control inputs 105i corresponding to the indicative state trajectory 125i, a motion model 127i of the vehicle including a sampled friction function and a measurement model 128i, the method determines 130i a state trajectory 135i. The state trajectory 135i is used to update 140i the PDF of tire friction function. If a termination condition 150i is met, the method outputs 155i the PDF of the tire friction function.

Figure 1J:
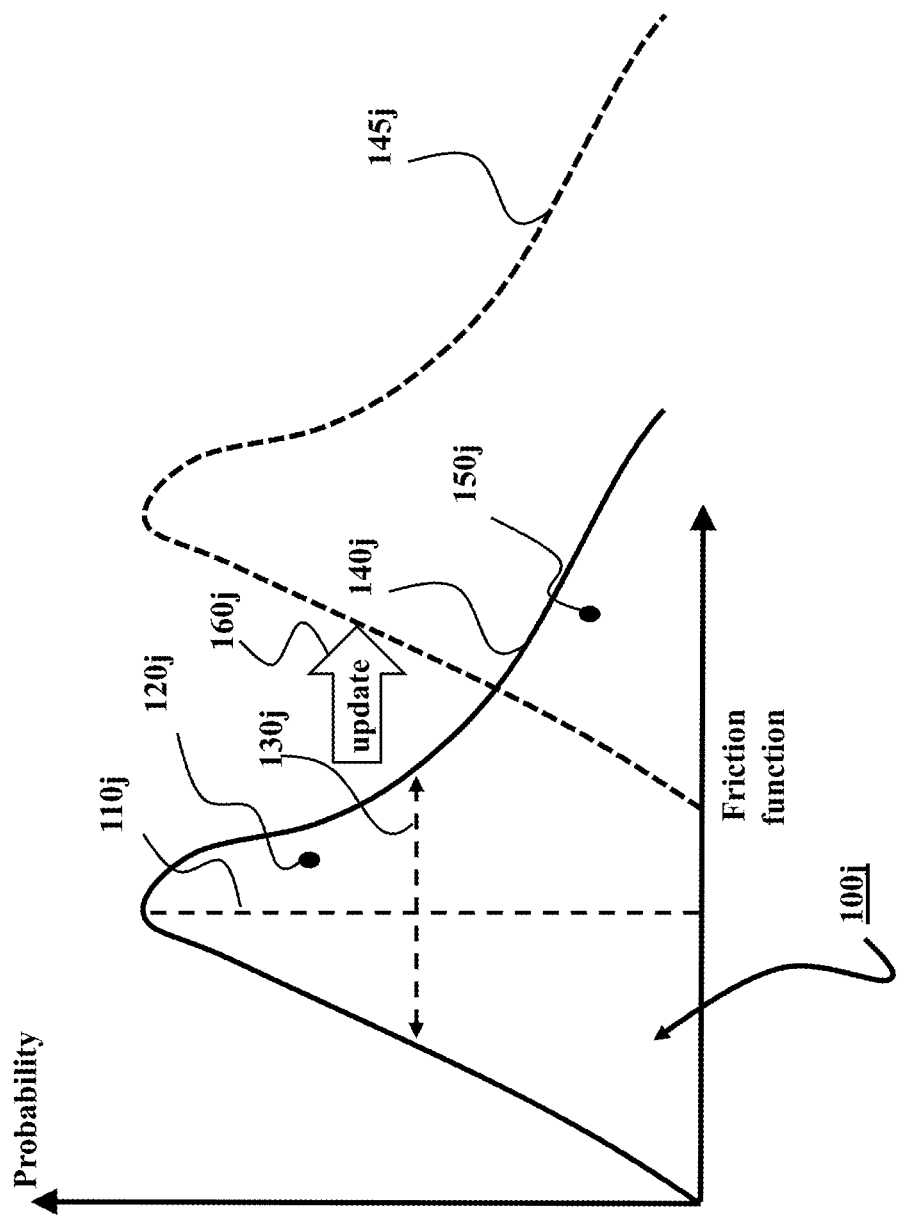
FIG. 1J shows a graph illustrating probability distribution function defining the feasible space of the tire friction function according to one embodiment.

FIG. 1J shows a graph illustrating probability distribution function 140j defining the feasible space 100j of the tire friction function according to one embodiment. The shape of the function 140j is updated in every iteration of the method 130e. For example, if the distribution of the state of stiffness is Gaussian, the shape of the distribution 140j is the "Gaussian hat" shape. As used herein, sampling the values of the tire friction function is drawing the values with probabilities defined by the distribution 140J. For example, according to the distribution 140J, the probability of a sample 120J to be drawn or sampled is higher than the probability of the sample 150J. Such a representation allows iteratively updating 160J the probability distribution of the tire friction function to produce an updated distribution 145J defining updated feasible space for sampling tire friction function in the next iteration, to be used in subsequent iterations until the termination condition 150i is met.

FIG. 1K shows a block diagram of a method for updating the PDF of a tire friction function according to one embodiment. The method determines 110k the probability distribution of the state trajectories by recursively estimating a distribution of the state using the motion model of the vehicle and updating the distribution of the state based on difference between corresponding states determined by the motion trajectory and by the measurement trajectory, e.g., by updating the distribution of the state difference of errors between corresponding states of the state trajectory of the vehicle and the indicative state trajectory of the vehicle.

Next, the method samples 120$k$ a state trajectory from the distribution of the state trajectory, and updates 130$k$ the distribution of the tire friction using the sampled state trajectory. Because the PDF of the state trajectory is updated using the sequence of measurements, updating the probability distribution of the tire friction iteratively using the sampled state trajectory from the state PDF successively reduces the error between the state trajectory and measurement sequence until the updated PDF 145$j$ of the tire friction function leads to the estimated PDF of state trajectory that minimizes the error between the state trajectory and the motion data. In principle, after the state trajectory is determined, the method adjusts a value of the sample of the tire friction function to reduce an error between the determined state trajectory and a state trajectory generated by the motion model with adjusted value of the sample of tire friction function and updates the probability distribution of the tire friction function to increase a probability of drawing the adjusted value of the sample from the updated probability distribution of the tire friction function.

Some embodiments are based on the realization that the unknown tire friction can be regarded as a stochastic uncertainty of the model of the motion of the vehicle, to produce a model of motion with unknown friction. Additionally or alternatively, another embodiment recognizes that there are typically other disturbances acting on the motion of the vehicle other than the uncertainty in tire friction. Those other disturbances can be, for instance, due to uncertainties in the actuators producing the control inputs, or other unmodeled dynamics, such as simplifications in the modeling of the suspension system of the tire.

Another embodiment is based on the understanding that if the stochastic uncertainty caused by the unknown tire friction is the only stochastic component, all other errors, as the aforementioned, would be described by the unknown tire friction, which would cause wrong estimates of the tire friction. For instance, if a planar vehicle model is used and the springs of the suspension system affects the acceleration, adding a process noise can ensure that the effects of the suspension system to the acceleration measurements is attributed to an external disturbance and not the PDF of tire friction function. Hence, one embodiment introduces a stochastic disturbance, the process noise, acting on one or combination of the motion model and the measurement model of the vehicle, which in combination with a stochastic disturbance describing the tire friction defines the complete motion of the vehicle.

For instance, in one embodiment, the probability distribution of the process noise is modeled as a Gaussian distribution defined by its mean and variance, where the process noise is introduced to model effects not captured by the tire friction function.

In some embodiments, when sampling a tire friction function, one sample is done per iteration of method 130$e$. However, in some embodiments, the process noise is treated differently. For instance, if the process is Gaussian, the mean and variance describes the Gaussian process noise. Doing in such a manner ensures that the tire friction function is kept fixed over the time of the indicative state trajectory for each iteration, which makes it possible to evaluate whether this tire friction function is a good sample or not. In one embodiment, the stochastic nature of the process noise is incorporated when determining the state trajectory 135$i$.

For example, some embodiments, after sampling the probability distribution of the tire friction function use probabilistic filters, such as a Kalman filter and a particle filter to determine the state trajectory that fit both the control inputs and the measurements according to the motion model and measurement model that are subject to noise.

Figure 2A:
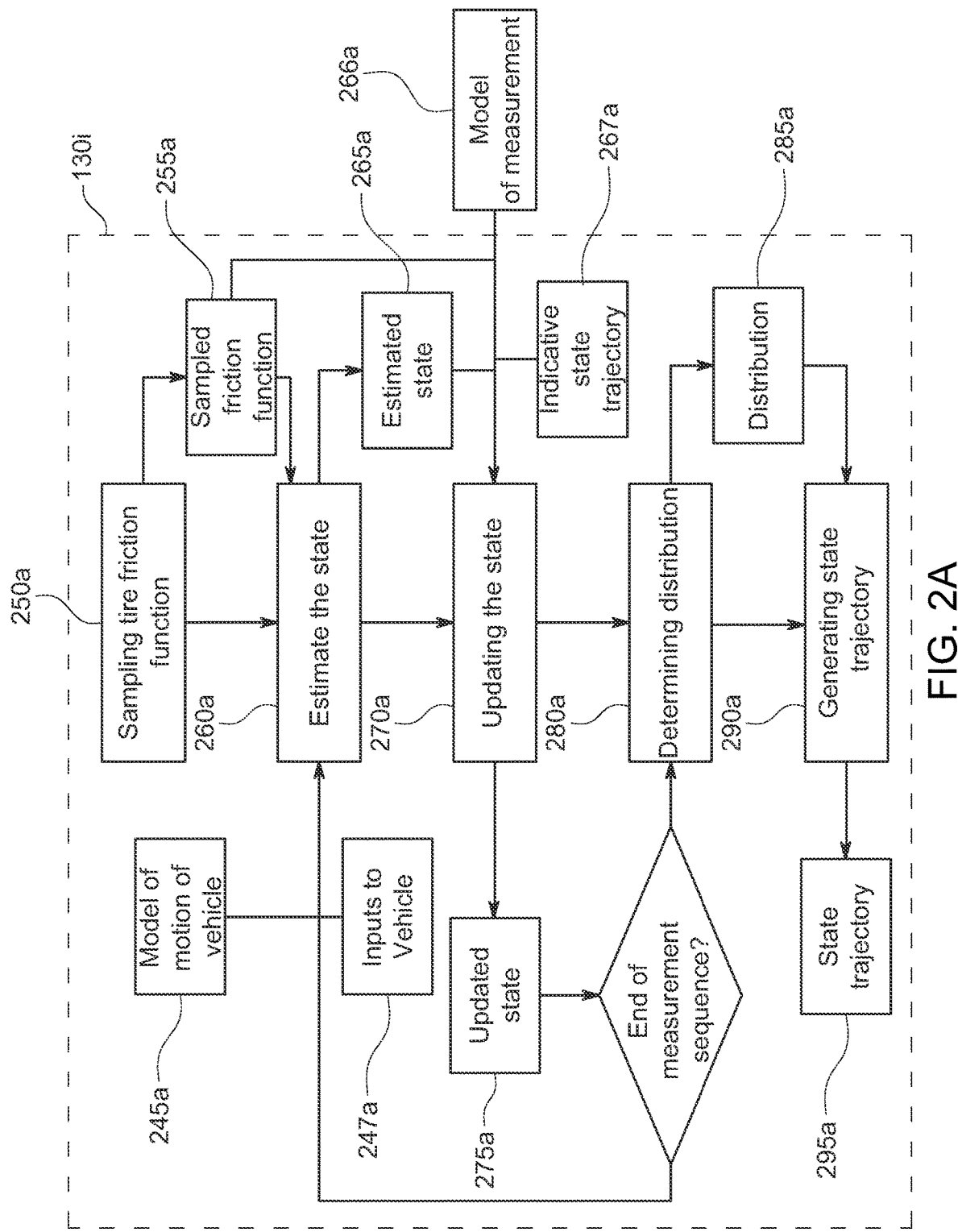
FIG. 2A shows a block diagram of a method for determining the state trajectory according to one embodiment.

FIG. 2A shows a block diagram of a method for determining 130$i$ the state trajectory 135$i$ according to one embodiment. This embodiment uses a variation of the Kalman filter configured to estimate a state of the vehicle and an uncertainty of the state at each time step to produce a distribution of state trajectories and sample the distribution of state trajectories to produce the state trajectory. In effect, this embodiment evaluates the sample of the PDF of the tire friction function in a probabilistic environment of the motion data.

The method commences with sampling 250$a$ the tire friction function, to produce a sampled 255$a$ tire friction function. Then, using the samples tire friction, the model 245$a$ of motion of the vehicle, the control inputs 247$a$ to the vehicle, the method estimates 260$a$ the state to produce an estimated state 265$a$. Using the estimated state 265$a$, the model 266$a$ of measurement and the indicative state trajectory 267$a$ at the current time step of control, the method updates 270$a$ the state to reduce an error between the state and indicative state. If the end of the indicative state trajectory has been reached, the method determines the distribution of the state 280$a$, and generates 290$a$, using the determined distribution 285$a$, a state trajectory 295$a$.

Estimating and updating the state can be done in several ways. For instance, in one embodiment the estimating the state is done by propagating a mean of a state and a variance of a state, and an update of the state is correcting the state with a multiple of the difference of the estimated state with the indicative state. For example, the estimating and updating can be done using a Kalman filter, possible combined with an additional Kalman smoothing step.

Conceptually, the Kalman filter uses a motion model of the vehicle, $x_{t+1}=a(x_t,u_t)+G(x_t,u_t)\mu(s_t)$, where $x_t$ is the state, $u_t$ is the control input, $a(x_t,u_t)+G(x_t,u_t)$ is the deterministic, known part of the motion model, and $\mu(s_t)$ is the tire friction function that is dependent on the wheel slip $s_t$ that is a function of the vehicle state. In some embodiments, the motion model includes an additive process noise $w_k$ as Gaussian distributed $w_k \sim N(0,Q_k)$. Using the measurement model $y_t=h(x_t,u_t)+D(x_t,u_t)\mu(s_t)+e_t$, where $h(x_t,u_t)+D(x_t,u_t)$ is the known part and $e_t$ is the stochastic measurement noise, The Kalman filter recursively traverses through the motion data to estimate the state using the motion model and the covariance of the state, $P_{k+1|k}=A_k P_{k|k} A_k^T + Q_k$, where A includes the linearization of the motion model and $Q_k$ is a term including the covariance of process noise. The Kalman filter also includes an update step, wherein the following equations are used for updating the PDF of the state trajectory $$\hat{x}_{k|k}=\hat{x}_{k|k-1}+K_k(y_k-C_k x_{k|k-1})$$

$$P_{k|k}=P_{k|k-1}-K_k S_k K_k^T$$

$$S_k=C_k P_{k|k}(C_k)^T+R_k$$

$$K_k=P_{k|k-1}C_k^T(S_k)^{-1}$$

Where $e_k \sim N(0, R_k)$ and C includes the linearization of the measurement model. In one embodiment, the Kalman filter is complemented with a backward recursion that iterates the motion data backwards in time. Doing in such manner ensures that all information is extracted from the data, as will be appreciated by a person skilled in the art.

Estimating and updating the state is suitable if it is believed that a Gaussian distribution does well represent the distribution 285a of the state. However, if this is not the case, other methods are possible. Examples of these method include a particle filter, a Gaussian-sum filter, a bank of Kalman filter, or unscented Kalman filter.

For instance, one embodiment generates a sample of a process noise for each corresponding values of the control input and the measurement. At each time step of control corresponding to the time steps of the control inputs and measurements, one embodiment samples from the process noise one or a multiple of samples the process-noise distribution and used as an additional component in the motion model. That is, when sampling a tire friction function, one sample is done per iteration of method 130e, but multiple samples are drawn of the process noise. Hence, each control input leads to a slightly different trajectory, where each will have a different difference to the indicative state trajectory determined from the sequence of measurements. Each sample of the process noise in combination with the same sample of the tire friction function forms a particle used to evaluate probabilistically the fitting between the control inputs and the measurements.

Figure 2B:
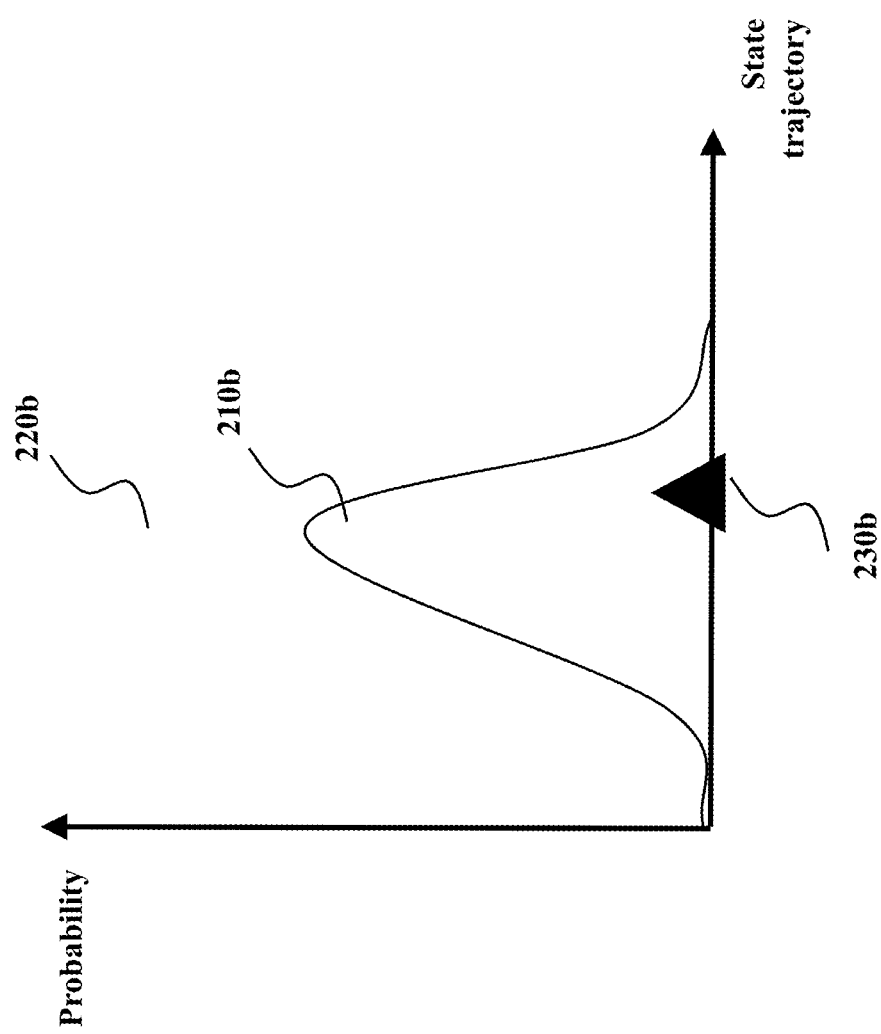
FIG. 2B shows a probability distribution of a state trajectory determined by one embodiment.

FIG. 2B shows a probability distribution of a state trajectory determined by one embodiment. Referring to FIG. 2B, in one embodiment the method 130i generates the state trajectory by constructing a Gaussian probability distribution function 210b from the estimated mean of state trajectory and covariance of state trajectory, and drawing a state trajectory 230b from the distribution 210b. Doing in such a manner always ensures that the state trajectory, used in updating the tire friction function, is representative of the distribution of the state trajectories.

Figure 2C:
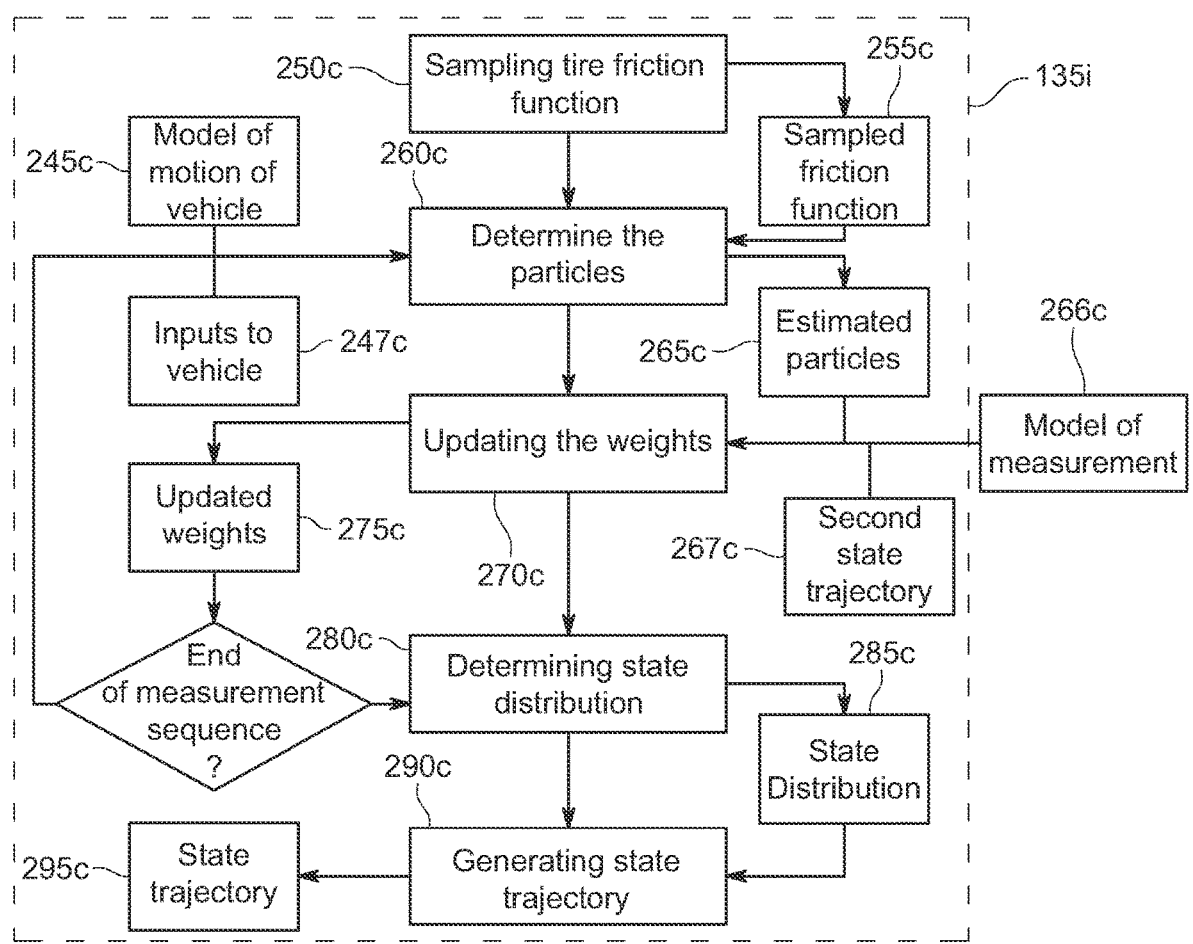
FIG. 2C shows a block diagram of another method for generating the state trajectory according to some embodiments.

FIG. 2C shows a block diagram of another method for generating the state trajectory 130i according to some embodiments. The method can be implemented using a processor of the vehicle. The method samples 250c a tire friction function 255c from the PDF of tire friction function to be used in a model of the motion 245. The model 245c of the motion of the vehicle includes an uncertainty on the motion of the vehicle due to the uncertainty in tire friction and an uncertainty on the motion of the vehicle due to the process noise. The method determines 260c, using the model 245c of the motion of the vehicle and inputs 247c to the vehicle, a set of particles 265c representative of the possible motions. The determining of the particles is done for each step of the control and measurement sequence, thus forming a trajectory of particles representing the state trajectory.

Next, the method uses the determined particles 265c and compares, using the model of measurement 266c, with the indicative state trajectory 267c of the vehicle, obtained from a memory, either located on the vehicle or remotely connected to a processor of the vehicle, to update the weights 270c that indicate how likely each particle is to be representative of the true state.

The model of the measurement 266c maps each determined particle to an indicative state, and the method produces updated weights 275c by calculating a difference between the indicative state trajectory 267c and each determined measured state, to reflect how well each determined particle 265c reflects the measurement. If the end of the indicative state trajectory has been reached, the method determines 280c the distribution of the state 285c, and generates 290c, using the determined distribution 285c, a state trajectory 295c.

For example, the method 280c can directly use the finite set of weights 275c to reflect the distribution of the state trajectory, or the method can produce a continuous distribution of the state trajectories, by smoothing out the weights using, e.g., a kernel density smoother. The resulting distribution 285c is then used for generating the state trajectory 290c. For example, one embodiment produces the first state trajectory 295c by generating a sample from the distribution 285c.

Using the motion model and the measurement model, the method determines the PDF of state trajectory as a weighted combination of state at each time t, $$p(x_t \mid y_{0:t}) \approx \sum_{i=1}^{N} q_t^i \delta_{x_t^i}(x_t),$$

wherein $\delta_{x_t^i}(x_t)$ is the Dirac delta mass and $q_t^i$ is the weight. Using the motion model including the sampled tire friction, one embodiment samples multiple samples from the process noise and propagates the state forward in time, and determines the weight according to $q_t^i \propto q_{t-1}^i p(y_t \mid x_t^i)$, wherein $p(y_t \mid x_t^i)$ is the measurement model written as a PDF, the likelihood.

Another embodiment determines the state trajectory as a combination of initial state trajectories weighted according to the weights of each initial first state trajectory. In one embodiment, a backward sweep using a particle smoother is used, to extract all information in the motion data. In yet another embodiment, one state trajectory is retained in one particle throughout. This state trajectory can be predefined, e.g., by simulating the system using the model of the motion of the vehicle and ensuring that this state trajectory is kept as one of the particles throughout. Doing in such a manner ensures the same performance as a particle smoother when performing iterative updates, but with less computational complexity. Or, at each determining the particles, the state trajectory is connected with one of the particles at a previous iteration of the method, where the connection is done by sampling a value for one of the particle indices with probability proportional to the updated weight 275c.

In some embodiments, the state trajectory 295c generated from the weights of each state trajectory representing, wherein the weights reflect an error between the state trajectory and the indicative state trajectory, is used to directly updating the probability distribution by decreasing the error between the state trajectory and the motion resulting in the state trajectory when used in the motion model. Such an error reflects the error due to the error in tire friction function and can be used to update the probability distribution of friction function. This is possible because the indicative state trajectory is already used in determining the state trajectory and is influencing the weight of each state trajectory.

Figure 2D:
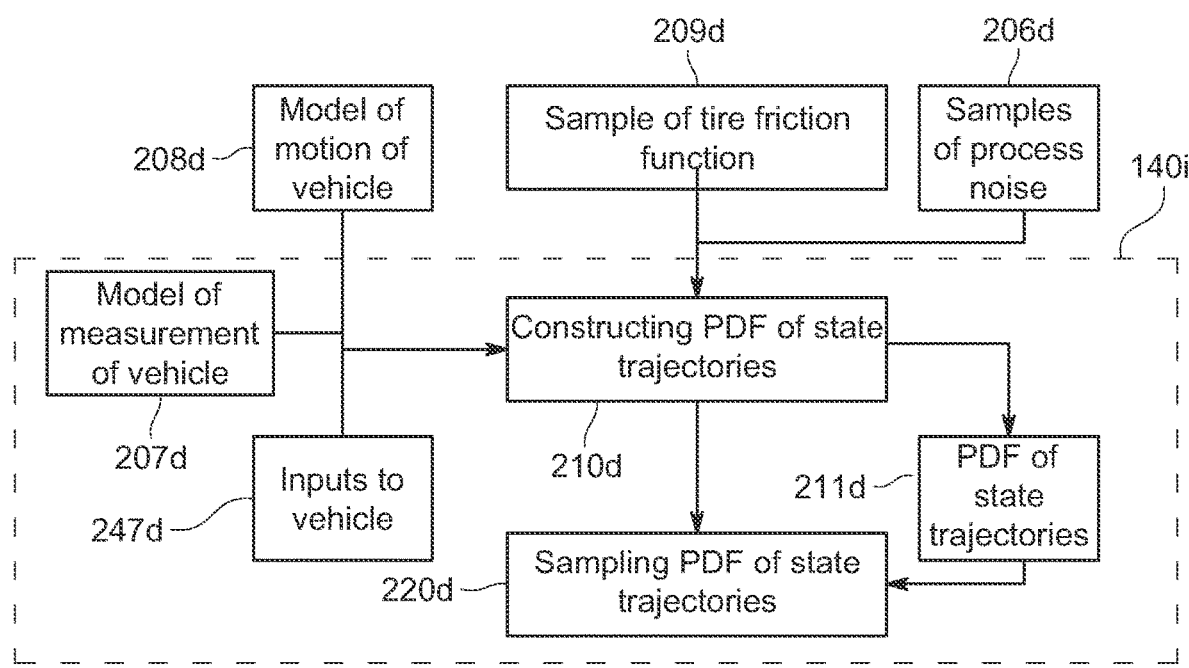
FIG. 2D shows a block diagram of one iteration of a method for updating the probability distribution of tire friction function according to one embodiment.

FIG. 2D shows a block diagram of one iteration of a method for updating 140i the probability distribution 155i of tire friction function according to one embodiment. Referring to FIG. 2D, in one embodiment the method 140i generates the state trajectory by constructing 210d a probability distribution function of state trajectory 211d from several state trajectories generated by the multiply sampled process noise 206d and the one-time sampled tire friction function 209d in the motion model 208d and the control inputs 247d weighted by the respective consistency with the indicative state trajectory defined by measurement model 207d, and drawing a state trajectory 230d from the distribution 210d. Doing in such a manner always ensures that the state trajectory, used in updating the tire friction function, is representable of the distribution of the state trajectories.

In some embodiments, the PDF of the tire friction function is a Gaussian process, i.e., a distribution over functions with a continuous domain, e.g. space, such that sample of the Gaussian process is a continuous tire friction function. Representing PDF of a tire function as a Gaussian process increase the accuracy of tire friction function estimation. However, estimating of the tire friction function according to principles of a Gaussian process is a computationally challenging task.

Some embodiments are based on realization of a manner of simplification the estimation of the Gaussian process to determine the tire friction function. Specifically, in some embodiments, a tire friction function is regarded as a weighted combination of a finite number of basis functions, wherein each basis function is a function of the wheel slip, which is a known function of the vehicle slip, and Gaussian process of the tire friction function is captured by Gaussian distributions of weights of basis function. In other words, to update Gaussian process some embodiments can just update these Gaussian distributions of weights, and to sample tire friction function some embodiments can just sample N scalar weights from Gaussian distribution. In effect, regarding the tire friction function as a weighted combination of basis functions significantly decreases the computational requirements for estimating the tire friction in probabilistic manner.

Figure 3A:
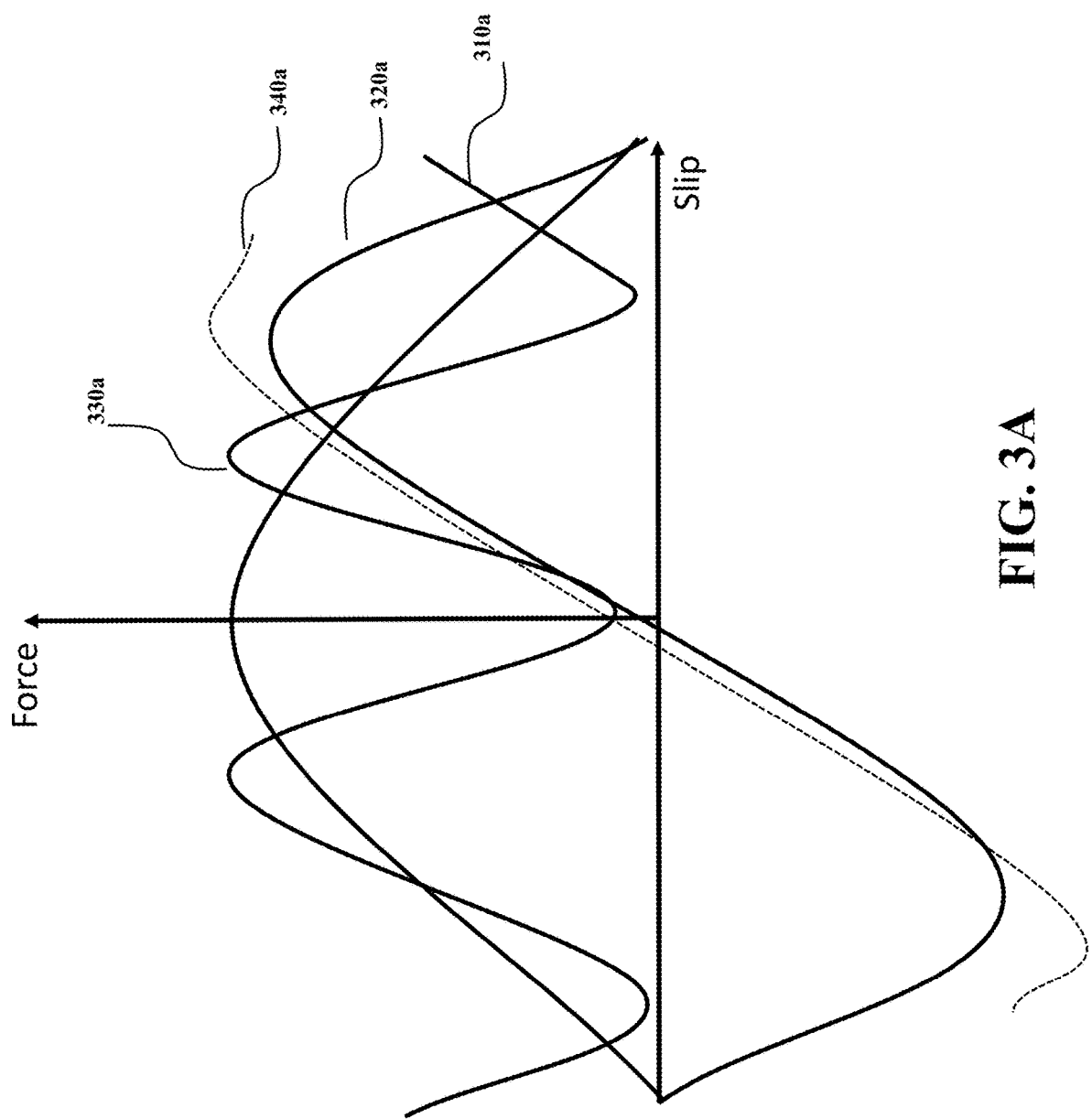
FIG. 3A shows an illustration of the use of weighted basis functions according to one embodiment.

FIG. 3A shows an illustration of the use of weighted basis functions according to one embodiment. In the illustration there are three basis function 310, 320a, and 330a. Also shown is the true tire friction function 340a. By combining the basis functions and using different weights for each basis functions, they can be combined to reproduce the true friction function.

Figure 3B:
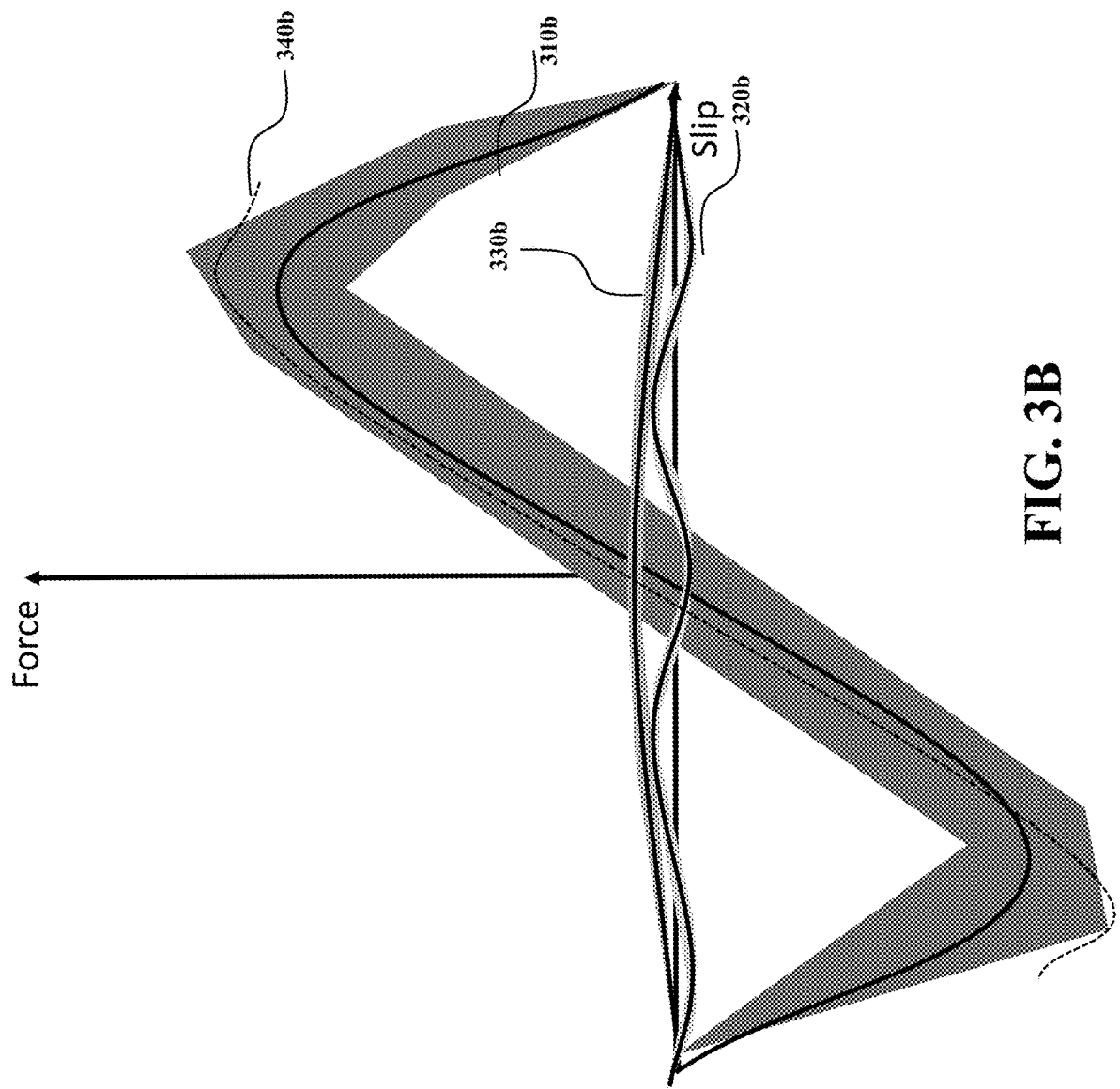
FIG. 3B shows an illustration of the influence of the weights of the basis functions for a subset of the friction function, in accordance with some embodiments.

FIG. 3B shows an illustration of the influence of the weights of the basis functions for a subset of the friction function 340b, in accordance with some embodiments. By letting the weights of functions 320b and 330b be very small, and the weight of 310b be large, the basis function expansion can reproduce the tire friction function 340b with only one basis function. Although FIG. 3B is a simplified schematic, it illustrates the principles of basis functions and the computational efficiency it can have.

In other embodiments, the tire friction function is a Gaussian process modeled as a weighted combination of a set of basis functions wherein each weight of each function has a Gaussian probability distribution, and wherein to update the probability distribution of the tire friction function the processor is configured to update the Gaussian probability distribution of at least some weights of the weighted combination of the set of basis functions. For instance, one embodiment models the tire friction function as $f(x) \sim GP(0, K(x,x'))$, wherein the covariance function $K(x,x')$ of the Gaussian process is formulated in terms of Laplace operators, $$\kappa_\theta(x, x') \approx \sum_{j_1,\ldots,j_d=1}^{m} S_\theta(\lambda^{j_1,\ldots,j_d}) \varphi^{j_1,\ldots,j_d}(x) \varphi^{j_1,\ldots,j_d}(x').$$

With basis functions $$\varphi^{j_1,\ldots,j_d} = \prod_{n=1}^{d} \frac{1}{\sqrt{L_n}} \sin\left(\frac{\pi j_n (x_n + L_n)}{2L_n}\right),$$

the tire friction function is $$f(x) \approx \sum_j \gamma^j \varphi^j(x),$$

where the weights are Gaussian distributed, $\gamma^j \sim N(0, S(\lambda^j))$.

One embodiment recognizes that using weighted basis functions can be used to model the motion of the vehicle as, $$\zeta_{t+1} = \begin{bmatrix} \gamma_1^1 & \cdots & \gamma_1^m \\ \vdots & \ddots & \vdots \\ \gamma_d^1 & \cdots & \gamma_d^m \end{bmatrix} \begin{bmatrix} \varphi^1(s_t) \\ \vdots \\ \varphi^m(s_t) \end{bmatrix} + w_t$$

Wherein A is the matrix of weights and φ(st) is the vector of basis functions as a function of the wheel slip. The left hand side can be obtained as a combination of the deterministic part of the motion model and the vehicle state in the future time step.

Figure 3C:
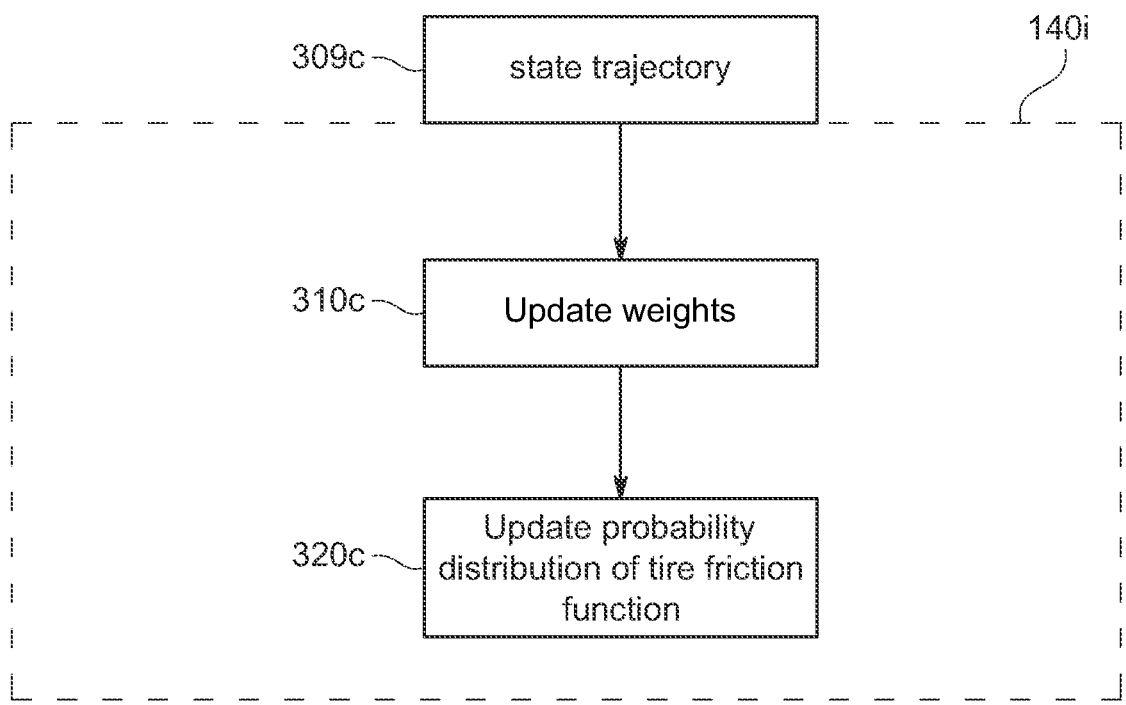
FIG. 3C shows a block diagram of one iteration of a method for updating the probability distribution of tire friction function according to one embodiment.

FIG. 3C shows a block diagram of one iteration of a method for updating 140i the probability distribution of tire friction function according to one embodiment. The method updates 310c the weights of the weighted combination of basis functions using the determined state trajectory 310c and updates the probability distribution 320c of the tire friction function according to the weighted combination of the basis functions weighted with the updated weights.

Figure 3D:
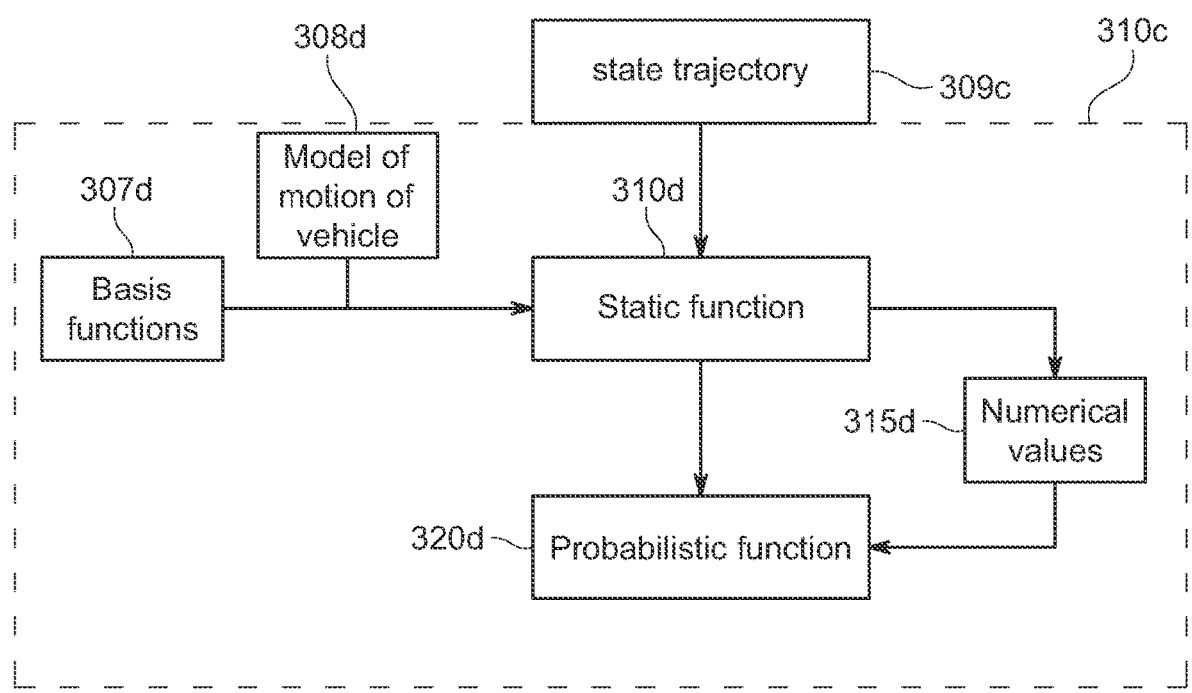
FIG. 3D shows a block diagram of a method for updating the weights of the weighted combination of basis functions according to one embodiment.

FIG. 3D shows a block diagram of a method for updating the weights of the weighted combination of basis functions according to one embodiment. The method uses a static function 310d stored in memory having as input the state trajectory 309c, the model of motion of vehicle 308d, and basis functions 307d, that maps the inputs to a set of numerical values 315 stored in matrices. Then, the method uses the determined numerical values 315d and a probabilistic function 320d mapping the numerical values 315d to a distribution of the weights. The updated weights can be sampled on that distribution of the weights or the distribution of the weights can be used directly in subsequent calculations.

In one embodiment, the probabilistic function is a matrix-Normal distribution parametrized by the numerical values 315d, that is, A~MN(0, Q, V).

In another embodiment, the process noise is parametrized as an inverse Wishart distribution, Q~IW ($l_Q$, $\Lambda_Q$). Updating the weights of basis functions and possibly also the process noise covariance is updating as a function of the state and measurement sequence as $$p(Q \mid x_{0:T}, y_{0:T}) = \mathcal{IW}(Q \mid T + \ell_Q, \Lambda_Q + \Phi - \Psi(\Sigma + V)^{-1}\Psi^T) \text{ and}$$

$$p(A \mid Q, x_{0:T}, y_{0:T}) = \mathcal{MN}(A \mid \Psi(\Sigma + V)^{-1}, Q, (\Sigma + V)^{-1}), \text{ wherein}$$

$$\Phi = \sum_{t=0}^{T} \zeta_t \zeta_t^T,$$

$$\Psi = \sum_{t=0}^{T} \zeta_t \varphi(s_t)^T,$$

$$\Sigma = \sum_{t=0}^{T} \varphi(s_t) \varphi(s_t)^T$$

are determined from the state trajectory as a static mapping from the determined state trajectory to updated weights of basis functions.

One embodiment recognizes that while the measurement model is dependent on the tire friction function, for instance, when using inertial sensors, having unknowns in both measurement model and motion model can lead to a very complex estimation problem. Hence, in one embodiment an a priori simplified model of the tire friction function is used in the measurement model in the first iterations. For instance, one embodiment uses a linear model of the tire friction function determined using standard methods. Doing in such a manner ensures that the estimation of the tire friction function is not underdetermined.

In one embodiment, after a number of iterations where the estimates have started to converge, the linear tire friction model is replaced with the sampled tire friction function. Doing in such a manner ensures that the linear model is not trusted excessively and that the true tire friction is eventually used in the measurement model.

Figure 4A:
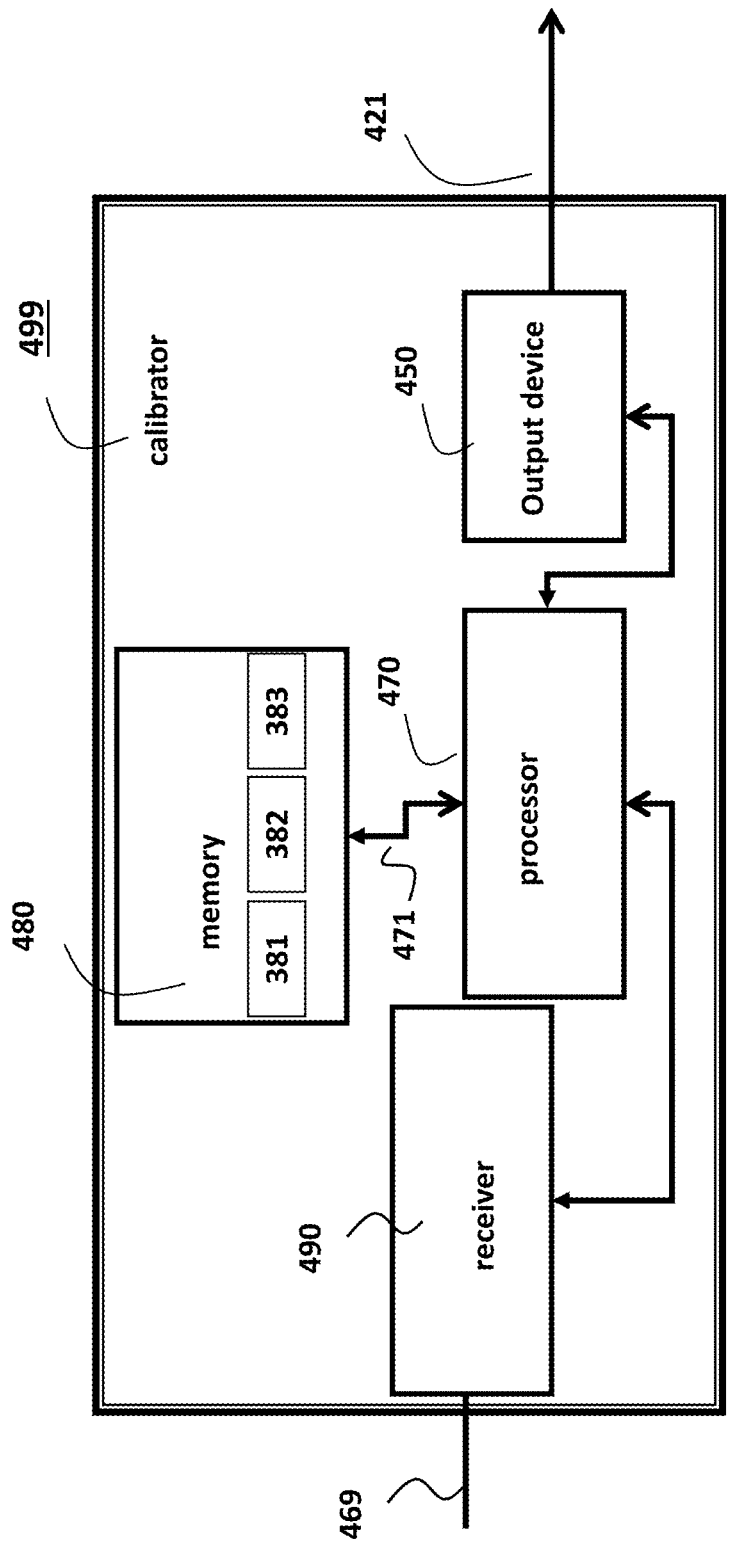
FIG. 4A shows a general structure of a system for calibrating a function of a tire friction of a vehicle traveling on a road according to one embodiment.

FIG. 4A shows a general structure of a system 499 for calibrating a function of a tire friction of a vehicle traveling on a road according to one embodiment. The tire friction is a nonlinear function describing a friction between a surface of the road and a tire of the vehicle as a function of slippage of a wheel of the vehicle. The tire function calibrator 499 includes at least one processor 470 for executing modules of the tire function calibrator 499, such as updating iteratively a probability distribution of the tire friction function until a termination condition is met.

The processor is configured to sample the probability distribution of the tire friction function, determine a state trajectory of the vehicle to fit the sequence measurements according to the measurement model and the sequence of control inputs according to the motion model including the sample of the tire friction function, and update the probability distribution of the tire friction function based on the state trajectory of the vehicle. For example, an iteration samples the probability distribution of the tire friction function, determines a first state trajectory of the vehicle resulting from the sequence of control inputs according to the motion model including the sample of the tire friction function, determines a second state trajectory of the vehicle resulting from the sequence of measurements according to the measurement model, and updates the probability distribution of the tire friction function to reduce an error between the first state trajectory of the vehicle and the second state trajectory of the vehicle.

The processor 470 is connected 471 to a memory 480 that stores a motion model 481 of the vehicle relating control inputs to the vehicle with a state of the vehicle and a measurement model 482 of the vehicle relating measurements of the motion of the vehicle with the state of the vehicle, wherein the motion model of the vehicle includes a tire friction function, and a probability distribution of the tire friction function.

The calibrator can also store 483 the motion data indicative of the motion of the vehicle on the road according to a trajectory, wherein the motion data include a sequence of control inputs to the vehicle that moves the vehicle according to the trajectory and a sequence of measurements of the motion of the vehicle moved along the trajectory, and wherein the sequence of measurements corresponds to the sequence of control inputs. Alternatively, the calibrator can contain a receiver 490 to receive motion data 469 indicative of the motion of the vehicle on the road according to a trajectory. The system also includes an output device 450 to render at least one or a combination of the probability distribution of the tire friction function and a sample of the probability distribution of the tire friction function when the termination condition is met. To enable certain embodiments of the invention, the memory 480 also stores 483 the internal information of the estimator, including, but not limited to, values of the tire friction function, values of each computed state trajectory of the vehicle for different iterations, the motion leading up to each state of the vehicle, and the sampled process noise leading up to the state trajectories.

In one embodiment, the motion data indicative of the motion of the vehicle is preprocessed before execution.

Figure 4B:
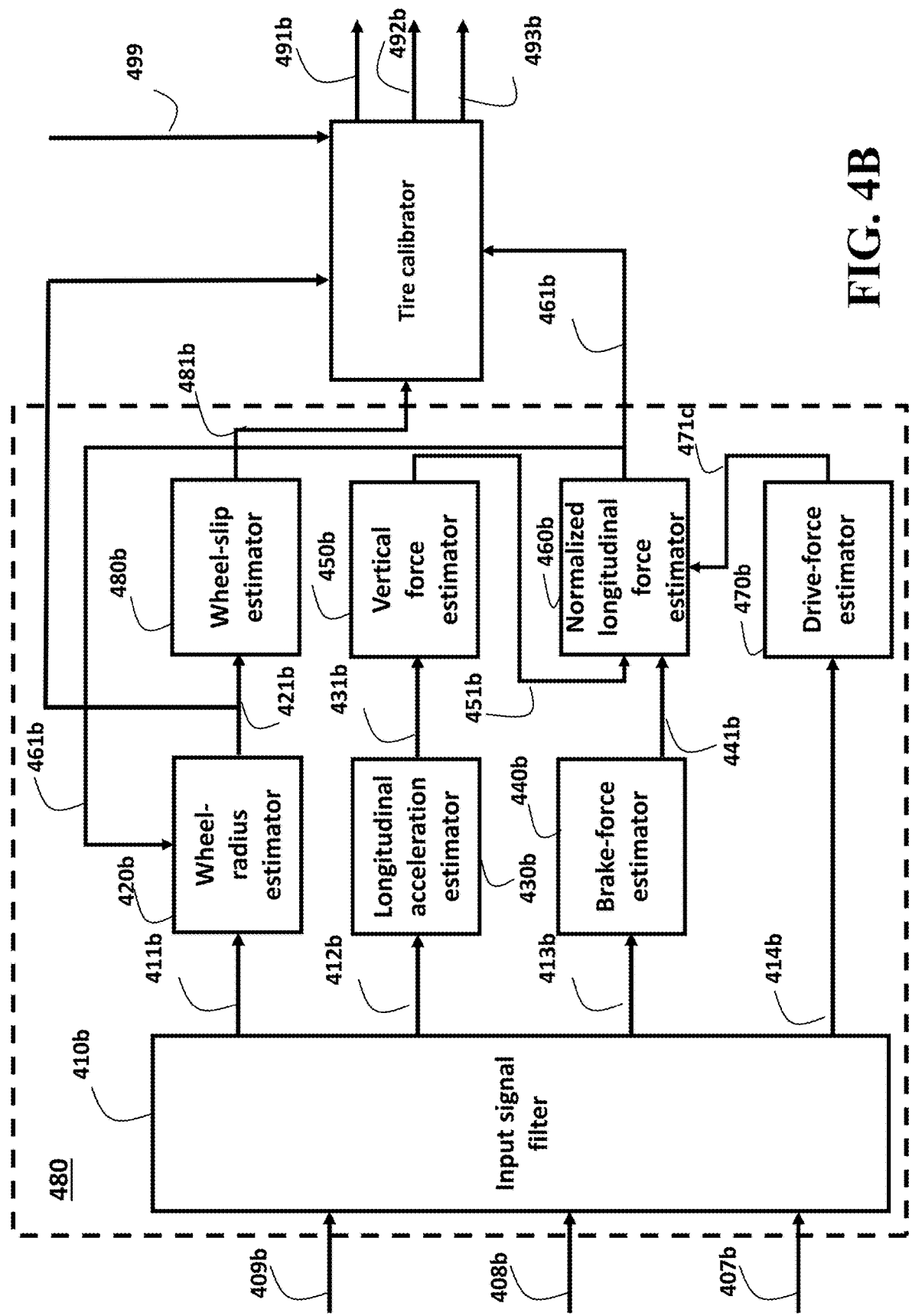
FIG. 4B shows a block diagram of a method for determining or estimating the internal signals from the vehicle, to be used by the tire function calibrator, according to one embodiment.

FIG. 4B shows a block diagram of a method for determining or estimating the internal signals from the vehicle, to be used by the tire function calibrator, according to one embodiment. The steps leading up to 481b and 461b can be implemented into a control unit or circuit arrangement, which can be used in systems such as ABS, ESP, ADAS, or in autonomous vehicles. For example, input signal filter 410b can determine the input signals by processing rotational rate of the wheels or tires 409b to produce a signal 411b, whereby the rotational rates can be determined for each individual wheel or tire of the vehicle. The filter 410b can also determine the input signal 412b by processing the brake pressure 408b and determine the input signal 413b by processing the rotational rate and torque from the engine 407b. The block 4301) determines the longitudinal acceleration 431b, while a brake-force estimator 440h estimates the braking force 441b for each wheel using the applied brake pressures 13b. From the values of the engine torques and rotation rate 414b of the engine, a module in the control unit estimates the driving force in the longitudinal direction, while the vertical force 451b is estimated in 450b, for example using estimates of the longitudinal acceleration 431b.

Using the vertical force estimates 451b and the longitudinal force estimates 441b and 471b, the normalized longitudinal force 461b can be determined. A wheel-radius estimator 420b uses the processed rotational rates 411b of the tires or wheels and the estimate of the normalized driving force 461b to correct the wheel radius and outputs the wheel radius with the rotation rates 421b. For example, the wheel-radius estimator 420b estimates the wheel-slip 321b. Thus, the signal conditioner 420 can provide the tire friction estimator 440 with estimates of the longitudinal velocity 421b, wheel-slip estimates 481b, or normalized longitudinal force 461b, or a combination thereof. Accordingly, in some embodiments, the tire calibrator 450 uses the estimates of one or combination of the longitudinal velocity 421b, wheel-slip estimates 481b, and normalized longitudinal force 461b.

Different types of motion models can be used. For computation purposes, a simple model is preferred, because it facilitates fast implementations computation wise. However, a high-fidelity model is preferred if model accuracy is important.

Figure 4C:
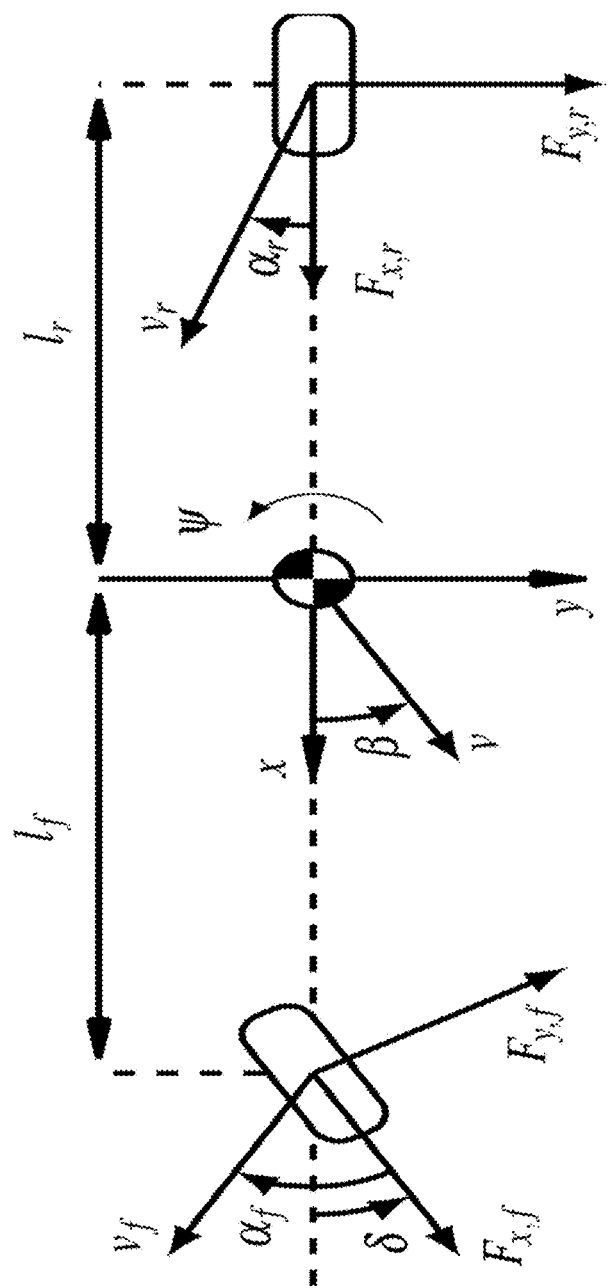
FIG. 4C shows a schematic of a simplified front-wheel drive single-track model of the vehicle, in which the two wheels on each axle are lumped together, in accordance with one embodiment.

Moreover, depending on the model that is employed by the invention, different number of parameters can be calibrated. FIG. 4C shows a schematic of a simplified front-wheel drive single-track model of the vehicle, in which the two wheels on each axle are lumped together, in accordance with one embodiment. This model depends on 4 tire friction functions when accelerating, one longitudinal and two lateral. In FIG. 4C, $\delta$ is the steering angle of the front wheel, $\alpha$ is the slip angle in the lateral case, $\beta$ is the body slip of the vehicle, which is defined as the ratio of the forward and lateral velocity of the vehicle, and is the longitudinal (forward) and lateral force, respectively.

Figure 4D:
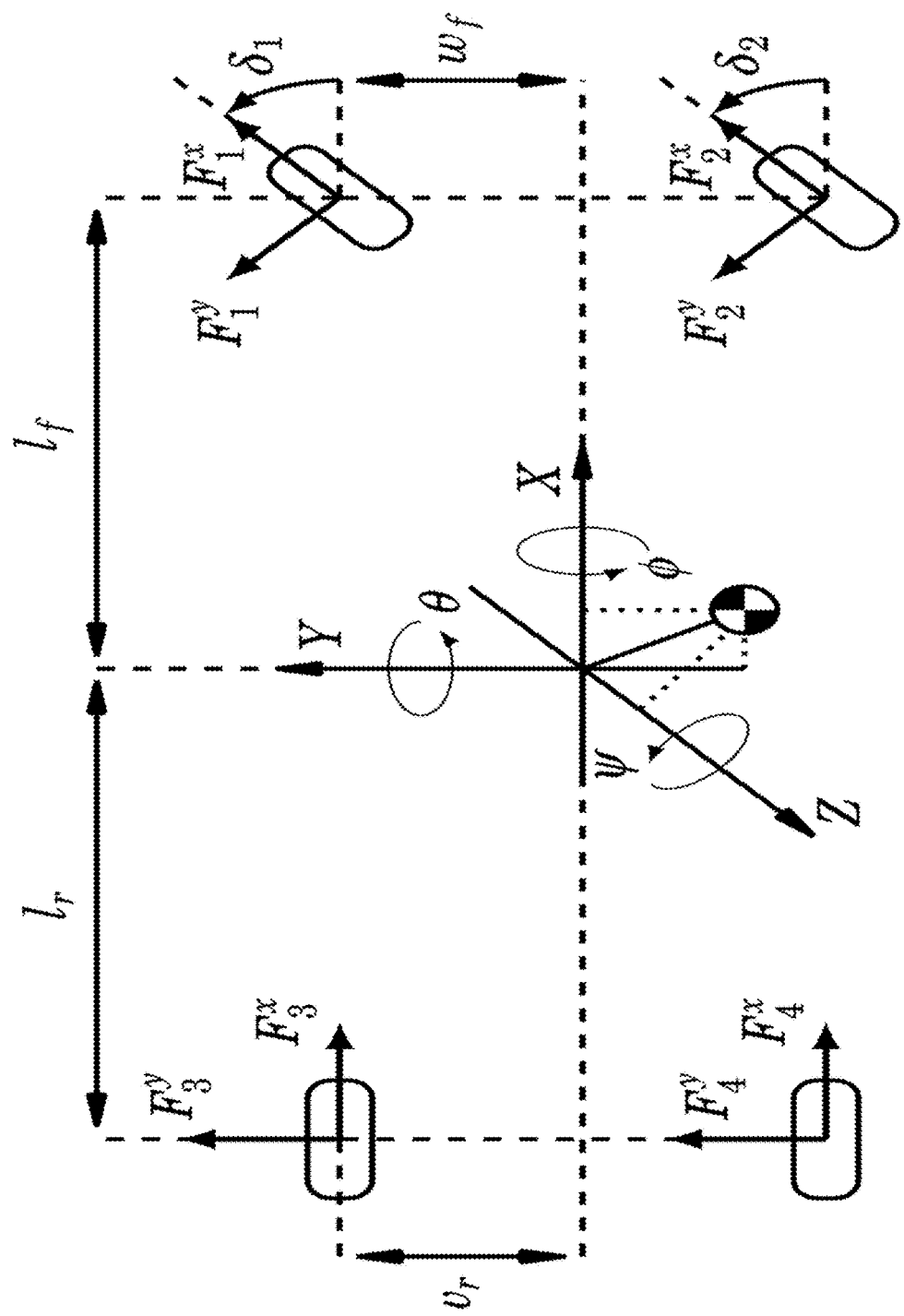
FIG. 4D shows a schematic of a double-track model, which models all 4 wheels used by one embodiment.

FIG. 4D shows a schematic of a double-track model, which models all 4 wheels, in accordance with one embodiment. With such a model, 8 tire friction functions affect the motion of the model of the vehicle.

Figure 5A:
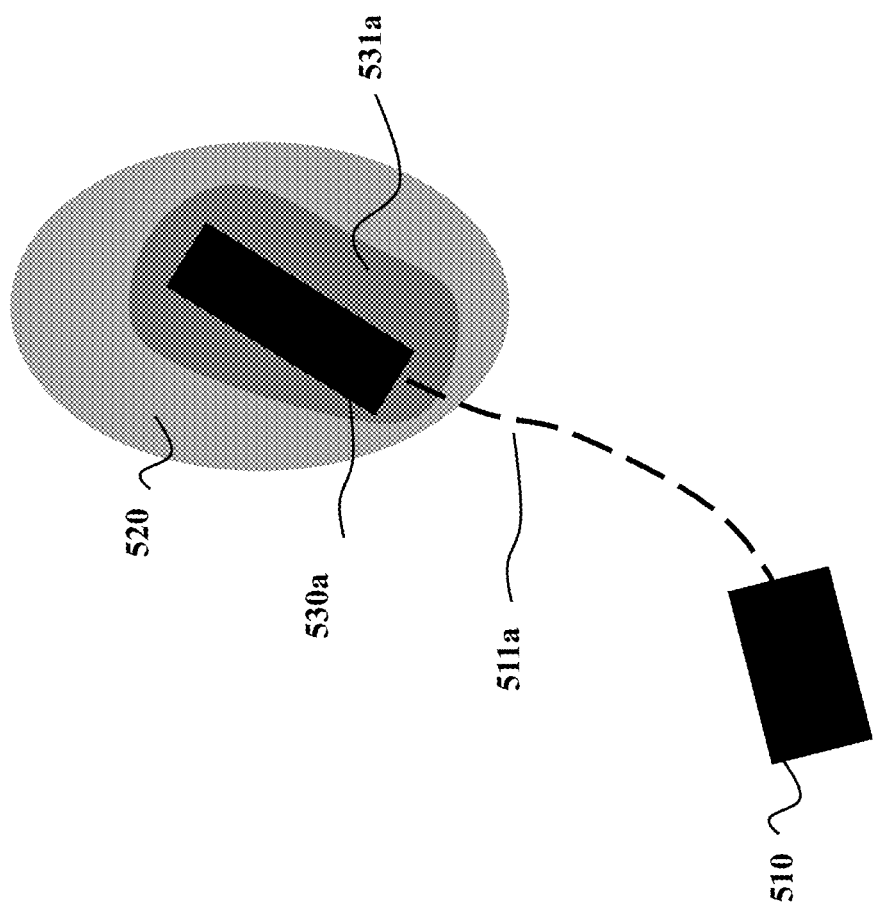

FIG. 5A shows schematic illustrating principles of some embodiments. Specifically, to illustrate why a properly determined first state trajectory can iteratively determine tire friction function, FIG. 5A shows a scenario where the vehicle has an initial state 510. For one sampled tire friction, sampled from the probability distribution of the tire friction, and a given input to the system, the vehicle obeys the motion 511*a* and ends up in 530*a*, with resulting uncertainty 531*a*. The inherent uncertainty in the second state trajectory arising due to noise, bias in sensors, and remaining sensor errors, leads to that the state of the vehicle can only be known up to a certain area 520. However, the end state of the vehicle 530*a* well resides within the area 520, so this particular combination of tire friction and initial state of the vehicle, is given a high probability of being a good combination. Hence, the probability distribution of the tire friction is likely to be a good distribution, since the sample of tire friction is a sample from said distribution.

FIG. 5B shows a vehicle with the same initial state 510, possibly with the same bias terms of the sensors, but with another particular sampled tire friction. For the same inputs to the system, the vehicle 510 now obeys the motion 511*b*, leading to that the vehicle ends up in state 530*b*, with resulting uncertainty 531*b*. However, this end state 530*b* of the vehicle does not reside within the certainty area of the sensors. Thus, this particular combination of initial state, sampled tire friction function, and bias terms, is assigned a low probability of being a good combination. Hence, the estimated distribution of the tire friction is less likely to be a good distribution.

In some embodiments, the generating the first state trajectory is done by generating a set of particles at each time step of control, each particle representing a first state trajectory, determined with different sample drawn from a probability distribution of a process noise and associate a weight $q_t^i$ with each particle, which reflects comparing each particle from the set with the second trajectory representing an error between the particle and the second state trajectory. In some embodiments, whenever a particle gets assigned a low weight below some threshold, the particle is removed from the estimating and replaced with a particle that has a higher weight, that is, a higher probability of being a good particle. In one embodiment, the determining the first state trajectory is performed as a combination of the particles weighted according to the weights of each particle.

Figure 6A:
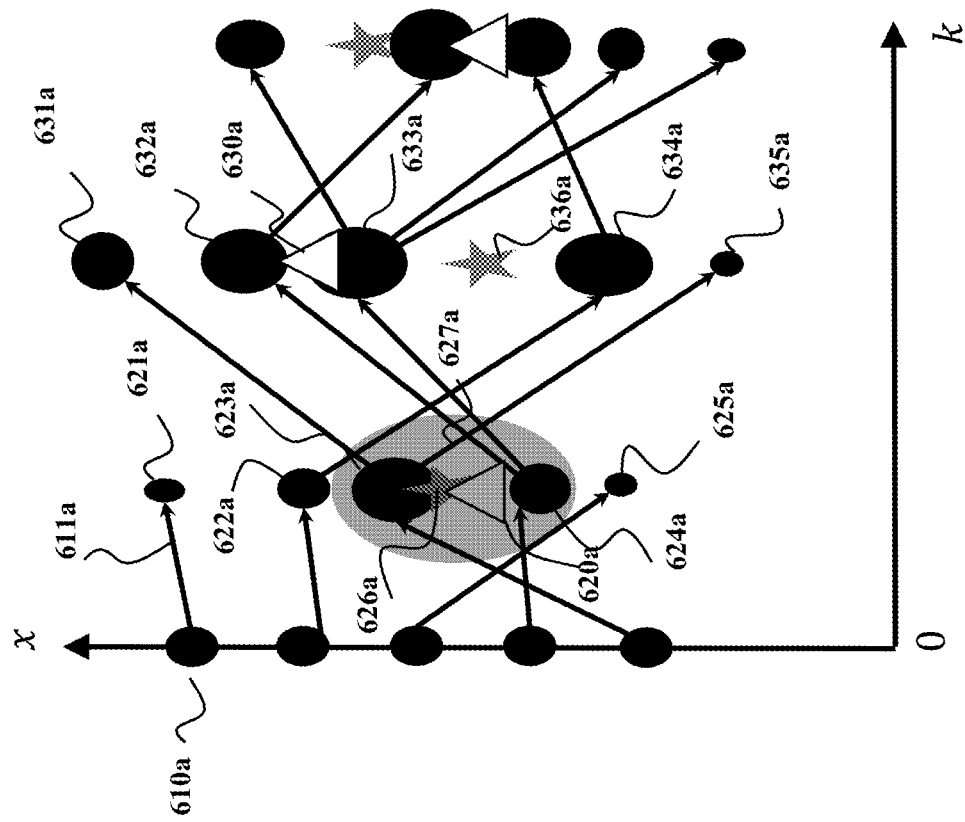
FIG. 6A shows a simplified schematic of the result of three iterations of generating a first state trajectory when five particles are generated for each iteration according to one embodiment.

FIG. 6A shows a simplified schematic of the result of three iterations of generating a first state trajectory when five particles are generated for each iteration according to one embodiment. The initial state 610*a* is predicted forward in time 611*a* using the model of the motion and the inputs to the system and the tire friction function sampled on the probability distribution of tire friction functions, to produce five next states 621*a*, 622*a*, 623*a*, 624*a*, and 625*a*. The probabilities are determined as a function of the measurement 626*a* and the model of the noise source and the bias 627*a* of the measurement 626*a*. At each time step, i.e., at each iteration, an aggregate of the probabilities is used to produce an aggregated state 620*a*.

Figure 6B:
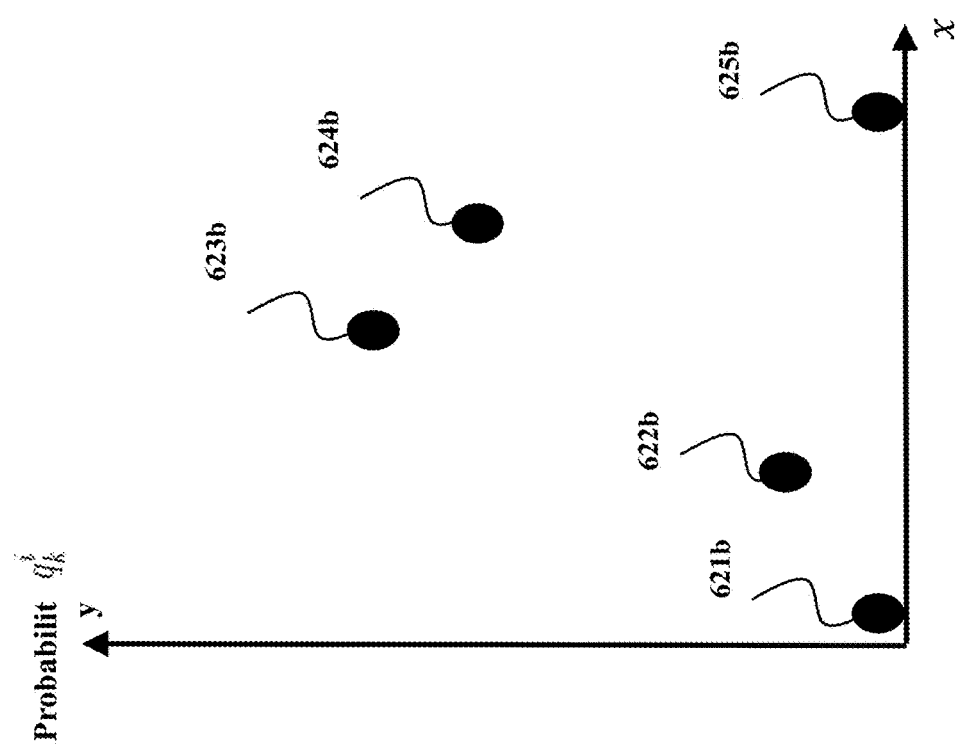
FIG. 6B shows possible assigned probabilities of the five states at the first iteration in FIG. 6A.

FIG. 6B shows possible assigned probabilities of the five states at the first iteration in FIG. 6A. Those probabilities 621*b*, 622*b*, 623*b*, 624*b*, and 625*b* are reflected in selecting the sizes of the dots illustrating the states 621*b*, 622*b*, 623*b*, 624*b*, and 625*b*.

There are many different tire models reported in literature. For instance, one way to model the tire force relation is through the Magic formula, or Pacejka model, given by $$F_0(m) = D \sin(C \arctan(B_m - E(B_m - \arctan(B_m)))), \quad (1)$$

Where B is the stiffness factor, C is the shape factor, D is the peak factor, corresponding to the peak friction coefficient, E is the curvature factor, $F_0$ is either the longitudinal force or lateral force, and m is either the longitudinal slip or the lateral slip. Equation (1) is highly nonlinear and depends on parameters defining linear and non-linear parts of the friction function.

Another method is based on the Highway Safety Research Institute (HSRI) tire model, which is stated as $$F_y = \begin{cases} C_\alpha \cdot \dfrac{\tan \alpha}{1+\lambda} & \text{if } s_r \leq 0.5 \\ C_\alpha \cdot \dfrac{\tan \alpha}{1+\lambda} \cdot \dfrac{s_r - 0.25}{s_r^2} & \text{if } s_r > 0.5 \end{cases},$$

$$\text{where } s_r = \dfrac{\sqrt{(C_\lambda \lambda)^2 + (C_\alpha \tan \alpha)^2}}{\mu(1+\lambda)F_z}.$$

Figure 7A:
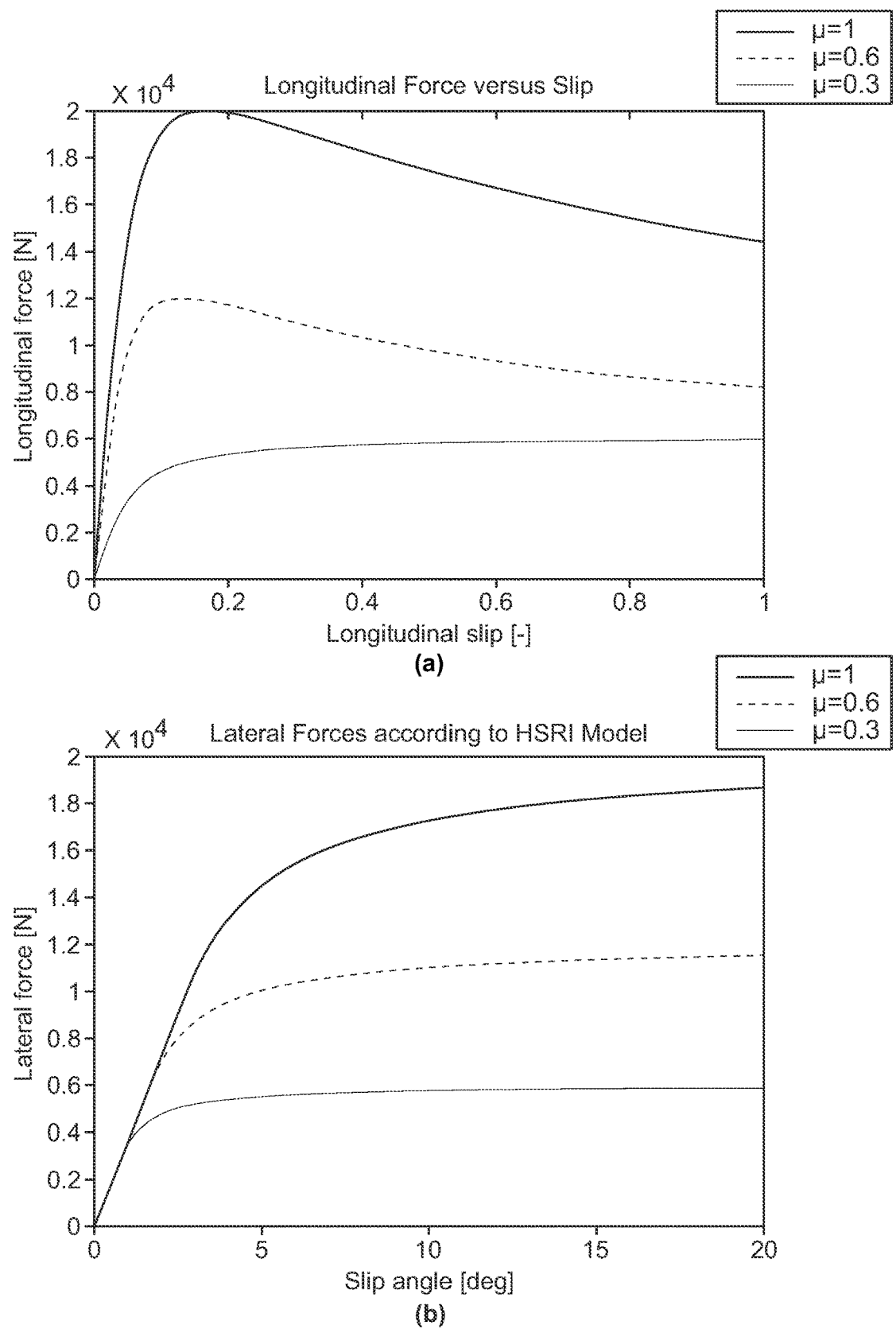
FIG. 7A shows a tire force plots as function of the wheel slip for different surfaces used by some embodiments.

FIG. 7A shows a tire force plots as function of the wheel slip for different surfaces used by some embodiments. Section (a) shows tire forces with the Pacejka model, and (b) shows the equivalent for the HSRI tire model. These are only two of the many different reported tire models parameterizing tire friction functions.

Even the two models try to describe the same behavior, (a) and (b) show significant differences. For instance, the Pacejka model (a) exhibits a clear peak in the tire friction curve for the two relatively higher friction surfaces, whereas the HSRI tire model is monotonically increasing with increasing slip values. Hence, a priori made choice of which tire model to use helps to accurately describe the behavior of the tire friction function, and thus the behavior of the motion model including the tire friction function. One embodiment is based on the recognition that any tire model is dependent on parameters fitted to data for that tire model, and that the data is highly uncertain.

Figure 7B:
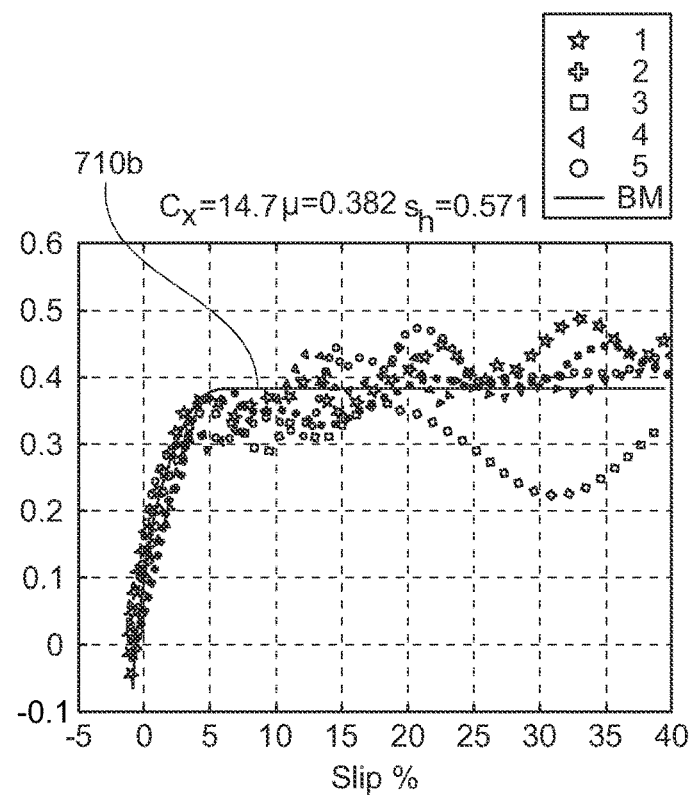
FIG. 7B shows measurement data obtained using a high-cost test rig, and a fitting of a Brush tire model to the data according to one embodiment.
Figure 7B:
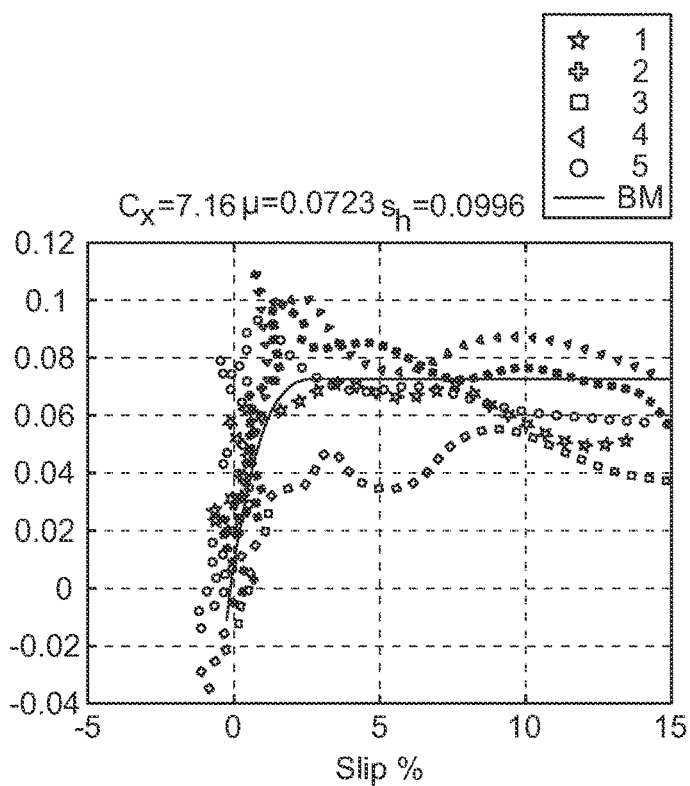

FIG. 7B shows measurement data obtained using a high-cost test rig, and a fitting 710*b* of a Brush tire model to the data according to one embodiment. The fitting of the parameters describing the model can be done in numerous ways, even when direct measurements of the friction are available. To this end, one embodiment determines a probability density of a tire friction function that is based on a weighted combination of basis functions because such a determination is nonparametric, i.e., does not depend on parameters of the model. Instead, such a determination only depends on scalar weights of each basis function.

Some embodiments are based on the realization that many control methods already used in production vehicles are based on different parametric tire models, and to deploy those controllers on a vehicle they need to be tuned according to the parameters of the tire model.

Figure 7C:
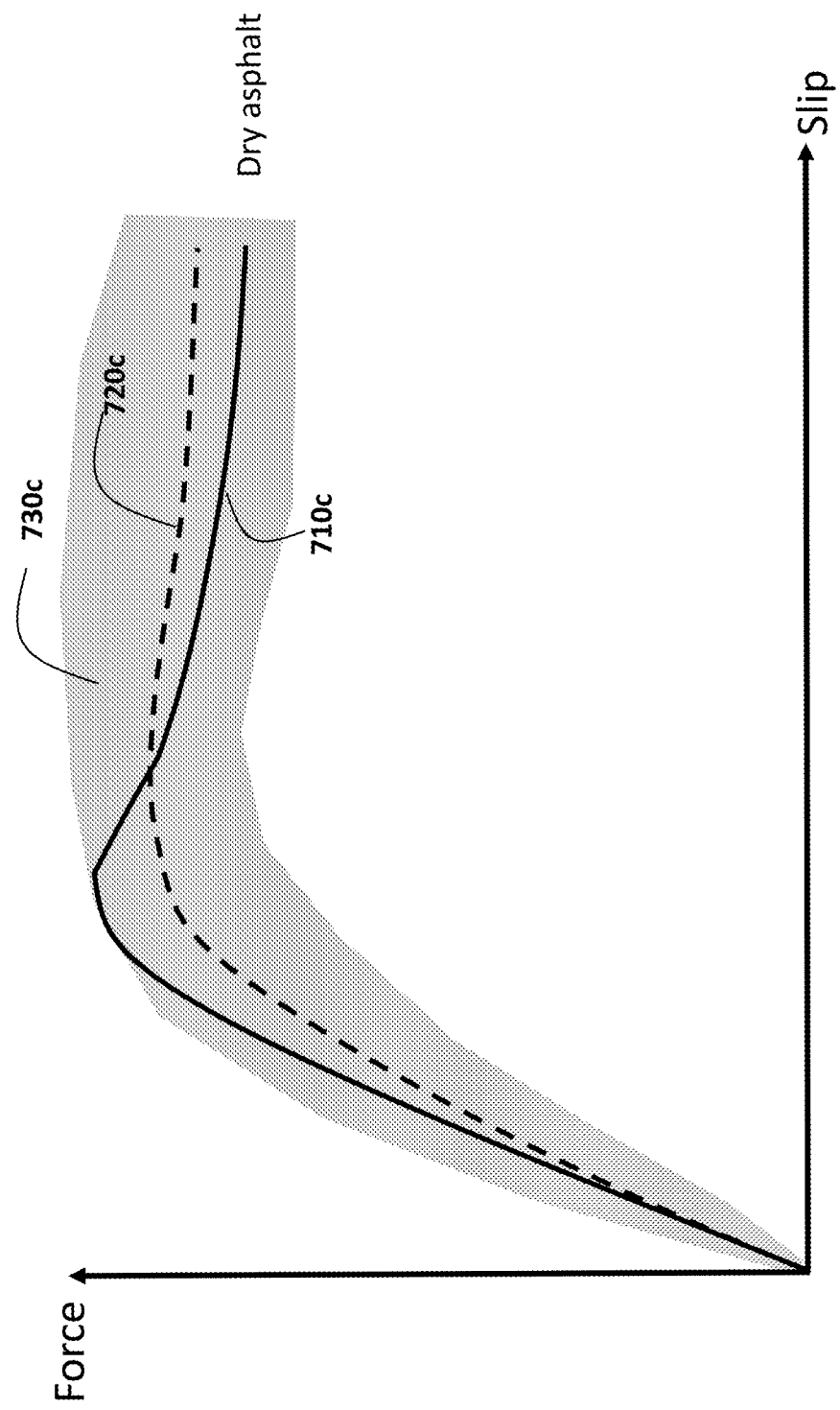
FIG. 7C shows a sample of the determined probability density as used by several embodiments.

FIG. 7C shows a sample 720*c* of the determined probability density 730*c* as used by several embodiments. Each sample on the probability density 730*c* is the entire tire friction function, such as a function 720*c*. From the sample 720*c* of the probability density it is possible to fit 710*c* a parametric tire model. For example, a common way to model the tire force relation is through the Magic formula, or Pacejka model, given by (1), which includes a number of parameters. Furthermore, the Pacejka model is oftentimes used for control design. In one embodiment, the fitting 710c of the Pacejka model to the sample 720c of the probability density 130f is done by minimizing an error between the sample 720c and 710c. In one embodiment, the minimizing is done while taking into account the uncertainty 730c, such that the fitting 710e is well inside the probability density.

For instance, one embodiment uses the minimization criterion $$\min_{\mu_i, B_i, C_i, E_i} \int \frac{1}{\text{cov}(A\varphi(\alpha_i))} \|\hat{A}\varphi(\alpha_i) - F_i(\alpha_i)\|^2 d\alpha_i,$$

where the error between the nonparametric model $\hat{A}\varphi(\alpha_i)$ and the Pacejka model $F_i(\alpha_i)$ is $\|\hat{A}\varphi(\alpha_i)-F_i(\alpha_i)\|^2$m which is integrated for all slip values of interest. Furthermore, cov $(A\varphi(\alpha_i))$ is the covariance of the probability density 730c, which is a measure of the spread of the probability density.

FIG. 8 shows a block diagram for how the selected parameters interact with various vehicle controllers according to some embodiments. The controller 810a is a model-based controller that uses a motion model 812a that includes parameters of friction function 813a to generate control command 804a to actuators 802a of the controlled vehicle. For instance, the controller can be a proportional-integra-derivative (PID) controller, or the controller 810a can be a model-predictive controller (MPC). The controller 810a can either be a stand-alone controller for autonomous driving or complementing actions of driver 807a for semi-autonomous driving. For instance, for autonomous driving the controller receives a reference trajectory 803a, state and input constraints 814a, and the motion model 812a, and generates a desired steering angle 804a of the wheel to control the lateral motion, and/or a desired velocity or acceleration 804a to control the longitudinal motion of the vehicle. For semi-autonomous driving, the driver 807a turns the steering wheel to obtain a steering angle 808a, possibly also with a longitudinal acceleration generated by the throttle/brake input. In such a case, the MPC can generate a correction of the driver's inputs to stabilize the vehicle in case of driving at-the-limits. In such a case, the inputs 806a from the actuators are used by the MPC.

One part of the motion model 812a includes the tire friction function parameterized by the selected parameters 813a. Using tabulated parameters stored in memory gives the benefits of not needing to estimate in real time the current friction coefficient. Instead, according to the implementation, preconfigured parameters are utilized in the MPC, which results in that the tire friction can be determined by inserting the current slip value in the tire friction function defined by the preconfigured parameters.

In one embodiment, a nonlinear model predictive controller (NMPC) controls a vehicle using a determined parametrized tire friction function. An MPC operates by optimizing a desired future behavior 803a of the vehicle in presence of constraints 814a. The MPC uses an internal prediction model using the motion model 812a and selected parameters 813a defining the tire friction function, and optimizes the vehicle behavior given model 812a and parameters 813a. In such a case, the MPC determines the optimal control commands to obtain an optimal state trajectory. In order to do this, the variation of the friction over the prediction horizon is determined using the tire friction function defining the relation between slippage of the wheel and the friction.

In one embodiment, the control command is determined by solving a tracking-type optimal control problem formulation $$\min_{X,U} \frac{T}{N} \sum_{i=0}^{N-1} \|F_{ref}(x_i) - y_{ref}(\tau_i, d)\|_W^2 + \|x_i - x_{ref}\|_Q^2 +$$
$$\|u_i - u_{ref}\|_R^2 + \|F_{ref}(x_N) - y_{ref}(\tau_N, d)\|_{W_N}^2 + \|x_N - x_{ref}\|_{Q_N}^2$$

s.t. $x_0 = \hat{x}_0$, $x_{i+1} = F_i(x_i, u_i), i = 0, \ldots, N-1,$ $0 \geq h(x_i, u_i), i = 0, \ldots, N-1,$ $0 \geq r(x_N).$ Where $x_{i+1}=F_i(x_i,u_i)$ where is the discrete-time motion model 812a and $0 \geq h(x_i,u_i)$, $0 \geq r(x_n)$ are the constraints 814a. The optimal control problem is known as a nonlinear programming (NLP), and there are various methods to solve this problem.

In one embodiment, the NLP is solved using sequential quadratic programming (SQP) using real-time iterations (RTIs). The RTI approach is based on one SQP iteration per control time step, and using a continuation-based warm starting of the state and control trajectories from one time step to the next. Each iteration consists of two steps:

(1) Preparation phase: discretize and linearize the system dynamics, linearize the remaining constraint functions, and evaluate the quadratic objective approximation to build the optimal control structured QP subproblem.

(2) Feedback phase: solve the QP to update the current values for all optimization variables and obtain the next control input to apply feedback to the system.

Another embodiment uses blockstructured factorization techniques with low-rank updates to preconditioning of an iterative solver within a primal active-set algorithm. This results in a relatively simple to implement, but computationally efficient and reliable QP solver that is suitable for embedded control hardware.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A system for calibrating a function of a tire friction of a vehicle traveling on a road, comprising:
    a memory configured to store a probability distribution of the tire friction function, a motion model relating control inputs to the vehicle with a state of the vehicle, and a measurement model relating measurements of motion of the vehicle with the state of the vehicle, wherein the tire friction function is a nonlinear function describing a friction between a surface of the road and a tire of the vehicle as a function of wheel slip of a wheel of the vehicle, wherein the motion model includes the tire friction function, and wherein one or combination of the motion model and the measurement model is subject to noise;
    an input interface configured to accept motion data indicative of motion of the vehicle on the road, wherein the motion data include a sequence of the control inputs to the vehicle that moves the vehicle on the road and a corresponding sequence of the measurements of the motion of the vehicle moved by the sequence of the control inputs;
    a processor configured to update iteratively the probability distribution of the tire friction function until a termination condition is met, wherein, for an iteration, the processor is configured to:
        sample the probability distribution of the tire friction function;
        determine a state trajectory of the vehicle to fit the sequence of the measurements according to the measurement model and the sequence of the control inputs according to the motion model including the sample of the tire friction function; and
        update the probability distribution of the tire friction function based on the state trajectory of the vehicle;
    an output interface configured to render at least one or a combination of the updated probability distribution of the tire friction function and the sample of the updated probability distribution of the tire friction function when the termination condition is met; and
    a controller configured to:
        determine a control command based on the tire friction function associated with the updated probability distribution of the tire friction function; and
        transmit the control command to an actuator of the vehicle to move the vehicle on the road.

2. The system of claim 1, wherein the processor is configured to
    determine a probability distribution of the state trajectories by recursively estimating a distribution of the state trajectory using the motion model of the vehicle and updating the distribution of the state trajectory based on difference between corresponding states determined by the motion trajectory and by the measurement trajectory; and
    sample the probability distribution of the state trajectories to produce the state trajectory of the vehicle for updating the probability distribution of the tire friction function.

3. The system of claim 2, wherein the processor is configured to for each time step execute a Kalman filter configured to estimate a state of the vehicle and an uncertainty of the state at each time step to produce the probability distribution of state trajectories.

4. The system of claim 2, wherein, for each time step, the Kalman filter determines the state of the vehicle and its uncertainty using the motion model and updates the state and its uncertainty using the measurement model.

5. The system of claim 1, wherein the processor for each time step in the motion data executes a particle filter configured to
    determine a set of particles, each particle represents the state trajectory determined with different sample drawn from a probability distribution of the noise;
    compare each particle from the set of particles with the measurements to determine a weight of each particle representing an error between the particle and a state trajectory indicated by the measurements according to the measurement model; and
    determine the state trajectory as a combination of the particles weighted according to the weights of each particle.

6. The system of claim 1, wherein the processor is configured to
    determine a set of initial state trajectories corresponding to different samples drawn from the probability distribution of the tire friction function;
    compare, using the measurement model, each initial state trajectory with the measurements to determine a weight of each initial state trajectory representing an error of fitting the initial state trajectory to the measurements; and
    determine the state trajectory as a combination of the initial state trajectories weighted according to the weights of each initial first state trajectory.

7. The system of claim 1, wherein the processor is configured to
    determine an indicative state trajectory of the vehicle from the sequence of measurements that indicatives the states of the vehicle according to the measurement model;
    determine the state trajectory of the vehicle resulting from the sequence of the control inputs according to the motion model including the sample of the tire friction function and the indicative state trajectory; and
    update the probability distribution of the tire friction function to reduce an error between the state trajectory of the vehicle and the indicative state trajectory of the vehicle.

8. The system of claim 1, wherein the measurement model of the vehicle includes the tire friction function, and wherein the state trajectory is determined using the measurement model including the sample of the tire friction function.

9. The system of claim 1, wherein the control inputs include commands specifying values of one or combination of a steering angle of the wheels of the vehicle and a rotational velocity of the wheels, and wherein the measurements include values of one or combination of a rotation rate of the vehicle and an acceleration of the vehicle, and wherein the state trajectories include a sequence of states, each state includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle at the same time step.

10. The system of claim 1, wherein the probability distribution of the tire friction function is a Gaussian process represented as a weighted combination of a set of basis functions, wherein each weight of each function has a Gaussian probability distribution, and wherein to update the probability distribution of the tire friction function the processor is configured to update the Gaussian probability distribution of at least some weights of the weighted combination of the set of basis functions.

11. The system of claim 10, wherein the processor is configured to
update the weights of the weighted combination of basis based on the state trajectory; and
update the probability distribution of the tire friction function using the combination of the basis function weighted with the updated weights.

12. The system of claim 11, wherein the processor, to determine the weights of the weighted combination of basis functions is configured to
submit the state trajectory and the basis functions to a static function mapping the state trajectory and the basis function to a set of numerical values;
determine, using a probabilistic function and the set of numerical values, distributions of the weights of the weighted combination of basis function; and
sample the distributions of the weights to produce the weights of the weighted combination of basis functions.

13. The system of claim 12, wherein the probabilistic function is a matrix-Normal distribution parametrized by the numerical values.

14. The system of claim 1, wherein the processor is configured to
adjust a value of the sample of the tire friction function to reduce an error between the state trajectory and a state trajectory generated by the motion model with the adjusted value of the sample of the tire friction function; and
update the probability distribution of the tire friction function to increase a probability of drawing the adjusted value of the sample from the updated probability distribution of the tire friction function.

15. The system of claim 1, wherein the processor is configured to
fit parameters of a parameterized tire model to the sample of the tire friction function; and
determine a control command using a current friction corresponding to a current slip of the tire according to the parameterized tire model.

16. The system of claim 15, wherein the parametrized tire model is a Pacejka tire model, and wherein the controller is a model predictive controller (MPC).

17. A method for calibrating a function of a tire friction of a vehicle traveling on a road, wherein the method uses a processor coupled to a memory, wherein the processor is coupled with stored instructions implementing the method, wherein the instructions, when executed by the processor carry out at least some steps of the method comprising:

storing, by the memory, a probability distribution of the tire friction function, a motion model relating control inputs to the vehicle with a state of the vehicle, and a measurement model relating measurements of motion of the vehicle with the state of the vehicle, wherein the tire friction function is a nonlinear function describing a friction between a surface of the road and a tire of the vehicle as a function of wheel slip of a wheel of the vehicle, wherein the motion model includes the tire friction function, and wherein one or combination of the motion model and the measurement model is subject to noise;
accepting motion data indicative of motion of the vehicle on the road, wherein the motion data include a sequence of the control inputs to the vehicle that moves the vehicle on the road and a corresponding sequence of the measurements of the motion of the vehicle moved by the sequence of the control inputs;
updating iteratively the probability distribution of the tire friction function until a termination condition is met, wherein an iteration comprises:
sampling the probability distribution of the tire friction function;
determining a state trajectory of the vehicle to fit the sequence of the measurements according to the measurement model and the sequence of the control inputs according to the motion model including the sample of the tire friction function; and
updating the probability distribution of the tire friction function based on the state trajectory of the vehicle;
outputting at least one or a combination of the probability distribution of the tire friction function and the sample of the probability distribution of the tire friction function when the termination condition is met;
determining, by a controller, a control command based on the tire friction function associated with the updated probability distribution of the tire friction function; and
transmitting, by the controller, the control command to an actuator of the vehicle to move the vehicle on the road.

18. The method of claim 17, further comprising:
determining a probability distribution of the state trajectories by recursively estimating a distribution of the state trajectory using the motion model of the vehicle and updating the distribution of the state trajectory based on difference between corresponding states determined by the motion trajectory and by the measurement trajectory; and
sampling the probability distribution of the state trajectories to produce the state trajectory of the vehicle for updating the probability distribution of the tire friction function.

19. The method of claim 18, wherein the probability distribution of the state trajectories is determined by executing a Kalman filter or a particle filter to estimate a state of the vehicle and an uncertainty of the state at each time step to produce the probability distribution of state trajectories.

20. A non-transitory computer readable storage medium embodied thereon a program executable by a processor for performing a method, the method comprising:
controlling the medium to store a probability distribution of the tire friction function, a motion model relating control inputs to the vehicle with a state of the vehicle, and a measurement model relating measurements of motion of the vehicle with the state of the vehicle, wherein the tire friction function is a nonlinear function describing a friction between a surface of a road and a tire of the vehicle as a function of wheel slip of a wheel of the vehicle, wherein the motion model includes the tire friction function, and wherein one or combination of the motion model and the measurement model is subject to noise, the method comprising:

accepting motion data indicative of motion of the vehicle on the road, wherein the motion data include a sequence of the control inputs to the vehicle that moves the vehicle on the road and a corresponding sequence of the measurements of the motion of the vehicle moved by the sequence of the control inputs;

updating iteratively the probability distribution of the tire friction function until a termination condition is met, wherein an iteration comprises:
   sampling the probability distribution of the tire friction function;
   determining a state trajectory of the vehicle to fit the sequence of the measurements according to the measurement model and the sequence of the control inputs according to the motion model including the sample of the tire friction function; and
   updating the probability distribution of the tire friction function based on the state trajectory of the vehicle;

rendering at least one or a combination of the probability distribution of the tire friction function and the sample of the probability distribution of the tire friction function when the termination condition is met;

determining, by a controller, a control command based on the tire friction function associated with the updated probability distribution of the tire friction function; and transmitting, by the controller, the control command to an actuator of the vehicle to move the vehicle on the road.

\* \* \* \* \*